(12) United States Patent
Cruz

(10) Patent No.: US 9,960,506 B2
(45) Date of Patent: May 1, 2018

(54) BEND RADIUS ADAPTERS AND METHODS OF FORMING SAME

(71) Applicant: QFE 002 LLC, Dover, DE (US)

(72) Inventor: Paul Martin Cruz, San Diego, CA (US)

(73) Assignee: QFE 002 LLC, Encinitas, CA (US)

( * ) Notice: Subject to any disclaimer, the term of this patent is extended or adjusted under 35 U.S.C. 154(b) by 0 days. days.

(21) Appl. No.: 15/264,342

(22) Filed: Sep. 13, 2016

(65) Prior Publication Data

US 2017/0077662 A1    Mar. 16, 2017

Related U.S. Application Data

(60) Provisional application No. 62/283,897, filed on Sep. 14, 2015.

(51) Int. Cl.
*H01R 11/09* (2006.01)
*H02G 3/04* (2006.01)
(Continued)

(52) U.S. Cl.
CPC .............. *H01R 11/09* (2013.01); *H02G 3/04* (2013.01); *H01R 4/36* (2013.01); *H01R 4/70* (2013.01)

(58) Field of Classification Search
CPC  H01R 2103/00; H01R 24/64; H01R 2107/00; H01R 25/162; H01R 24/28;
(Continued)

(56) References Cited

U.S. PATENT DOCUMENTS 3,207,839 A * 9/1965 Joly ................. H01R 13/64
174/72 C
3,335,399 A * 8/1967 Rys ..................... H01H 1/5855
439/739

(Continued)

FOREIGN PATENT DOCUMENTS

| EP | 2 498338 | 9/2012 |
|---|---|---|
| EP | 2 768078 | 8/2014 |
| FR | 1 224 522 | 6/1960 |

OTHER PUBLICATIONS

International Search Report and Written Opinion of the International Search Authority issued in PCT/US2016/051536 dated Nov. 15, 2016.

*Primary Examiner* — Truc Nguyen
(74) *Attorney, Agent, or Firm* — Knobbe, Martens, Olson & Bear, LLP

(57) ABSTRACT

Bend radius adapters can be used to form connections between low-gauge electrical wires or cables, and can provide greater flexibility in the manner in which low-gauge electrical wiring or structures with equivalent load capacity can be routed through and within electrical systems and associated structures. For example, when electrical systems are being upgraded or repaired, it may be difficult or impossible to route lower-gauge or additional wiring through existing structures such as conduits and junction boxes without violating safety standards regarding the minimum bend radius of such wiring. The use of bend radius adapters can provide additional flexibility in utilizing existing electrical system structures, and can simplify installation of other electrical components.

17 Claims, 28 Drawing Sheets

(51) Int. Cl.
*H01R 4/36* (2006.01)
*H01R 4/70* (2006.01)

(58) Field of Classification Search
CPC .. H01R 12/79; H01R 4/2433; H01R 13/2414; H01R 13/2435; H01R 13/502; H01R 13/506; H01R 13/514; H01R 13/6275; H01R 13/6461

See application file for complete search history.

(56) References Cited

U.S. PATENT DOCUMENTS

| | | | |
|---|---|---|---|
| 3,829,825 A | 8/1974 | Hawkins | |
| 4,500,161 A | 2/1985 | Keglewitsch et al. | |
| 4,519,668 A * | 5/1985 | Fujita | H01R 4/301 439/775 |
| 5,364,281 A * | 11/1994 | Leto | H01R 4/643 403/378 |
| 6,464,516 B2 * | 10/2002 | Baldock | H01R 25/147 174/36 |
| 8,079,865 B1 | 12/2011 | Rundle | |
| 8,152,573 B2 | 4/2012 | Bauer et al. | |
| 2003/0236016 A1 | 12/2003 | Murakami et al. | |
| 2006/0035499 A1 * | 2/2006 | Johnson | H01R 12/592 439/215 |
| 2009/0163087 A1 | 6/2009 | Sweeney et al. | |
| 2010/0130072 A1 * | 5/2010 | Cecil | H01R 4/20 439/730 |
| 2010/0328853 A1 * | 12/2010 | Johnson | H01R 25/16 361/641 |
| 2013/0065430 A1 * | 3/2013 | Adachi | H01R 13/521 439/521 |
| 2014/0051282 A1 * | 2/2014 | Tanaka | H01R 13/6581 439/502 |
| 2014/0057484 A1 * | 2/2014 | Byrne | H01R 13/46 439/527 |
| 2015/0244115 A1 * | 8/2015 | Yamaguchi | H01R 13/6581 439/580 |

* cited by examiner

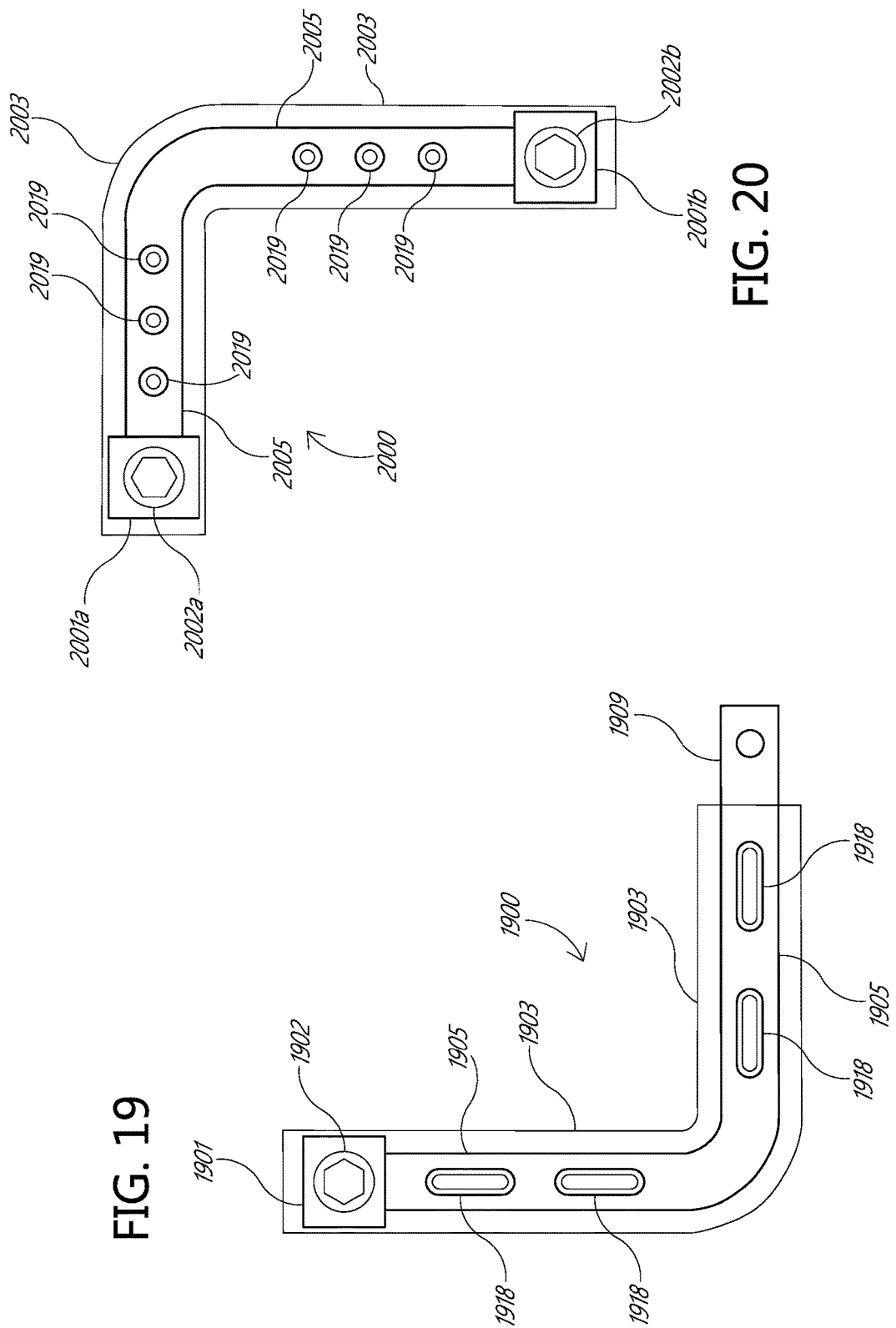

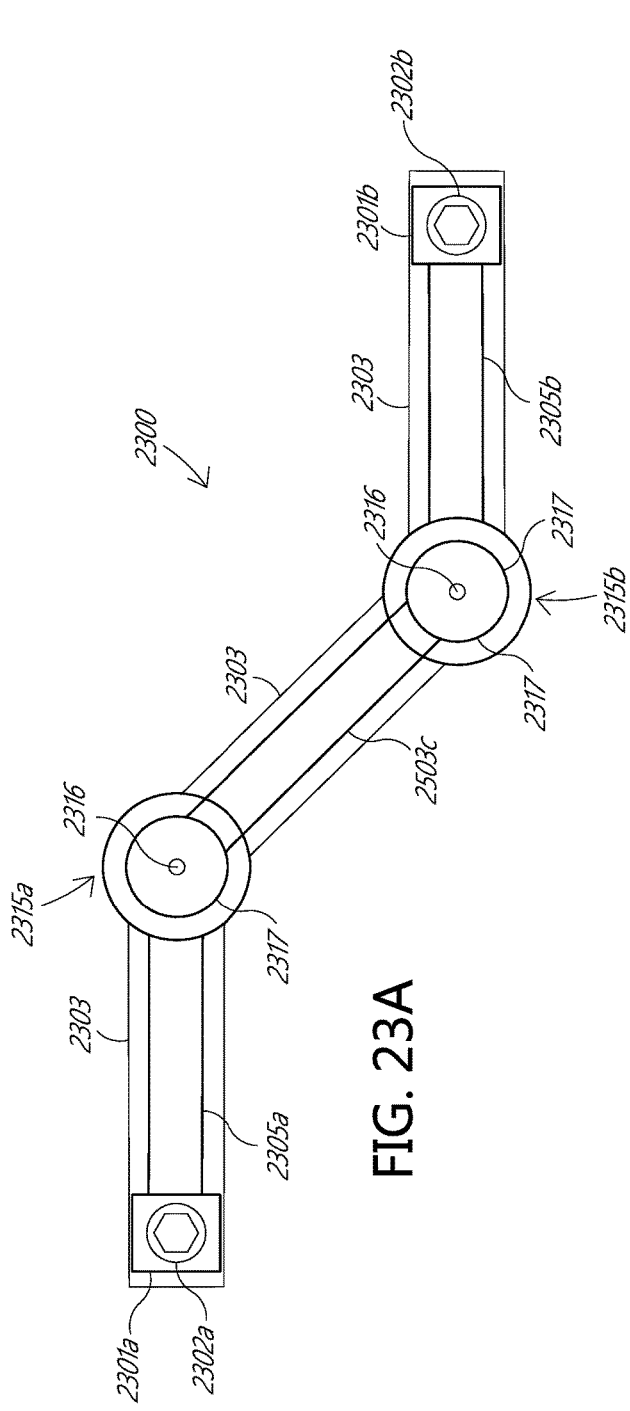
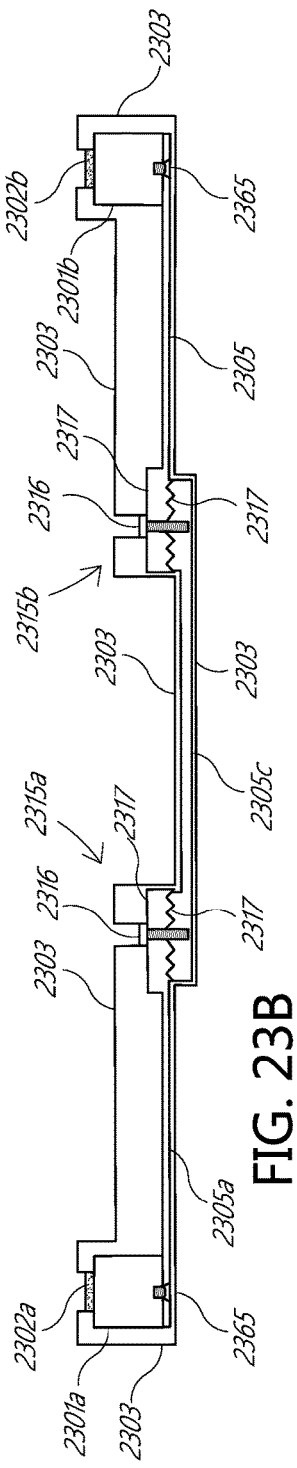
FIG. 23A
FIG. 23B

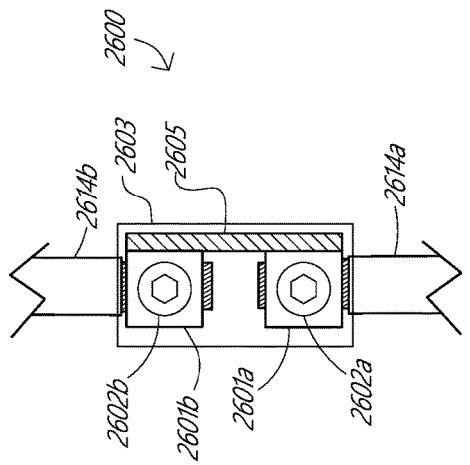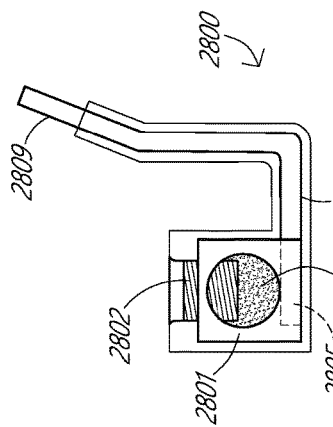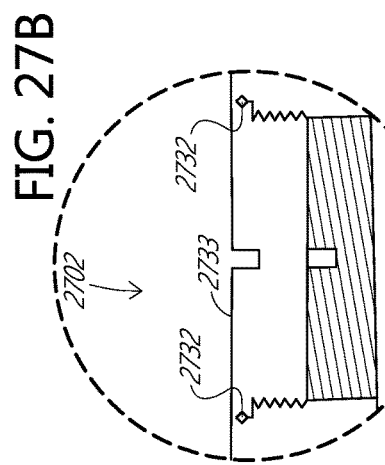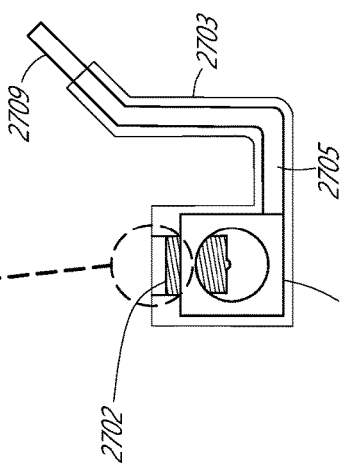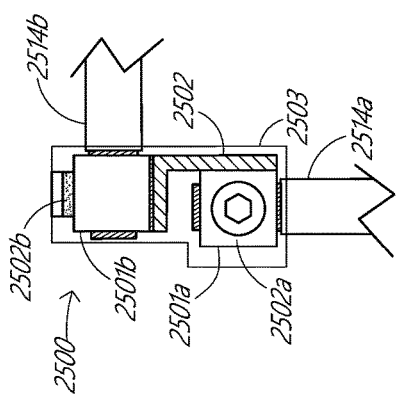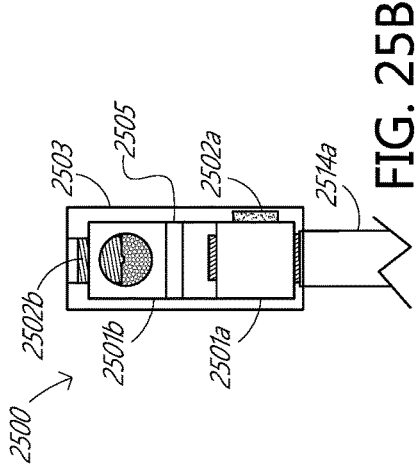

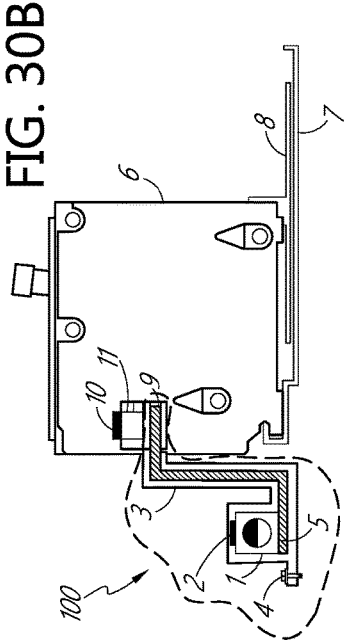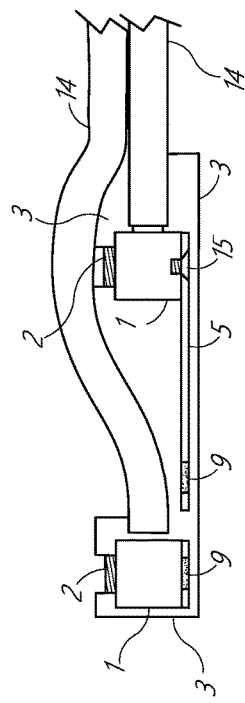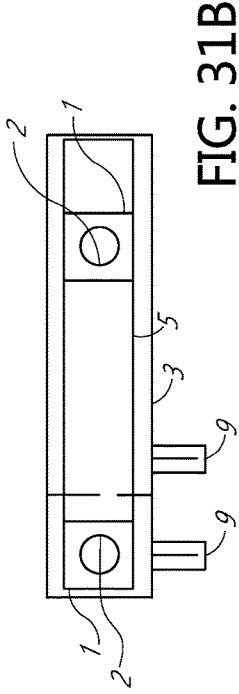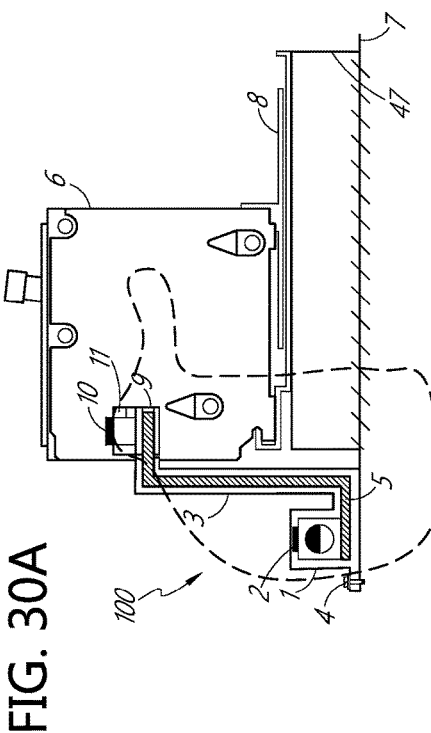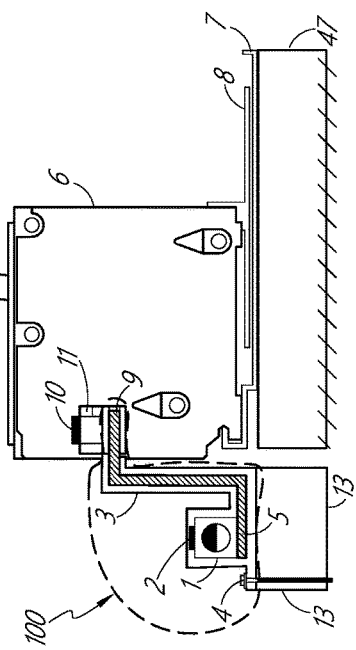

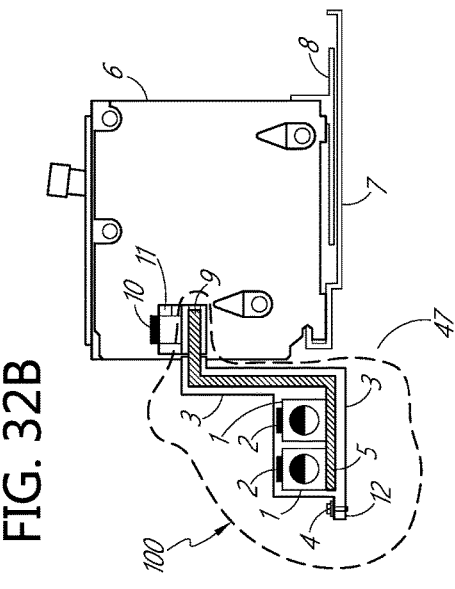
FIG. 32B
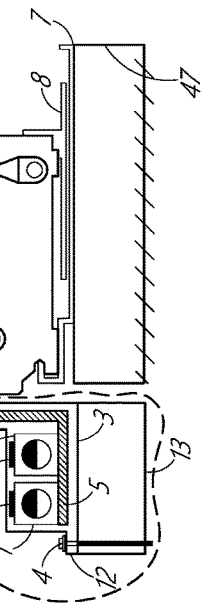
FIG. 32C
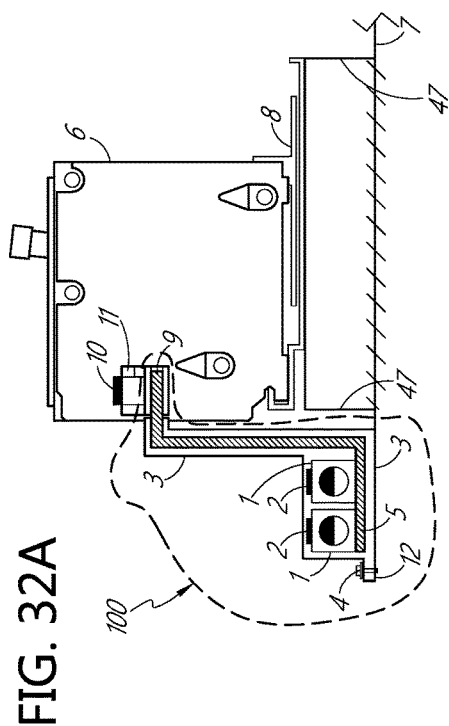
FIG. 32A
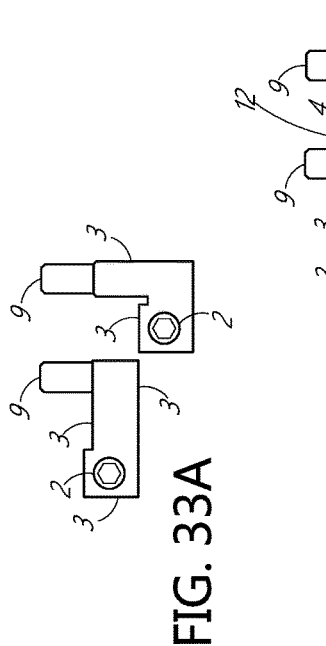
FIG. 33A
FIG. 33B

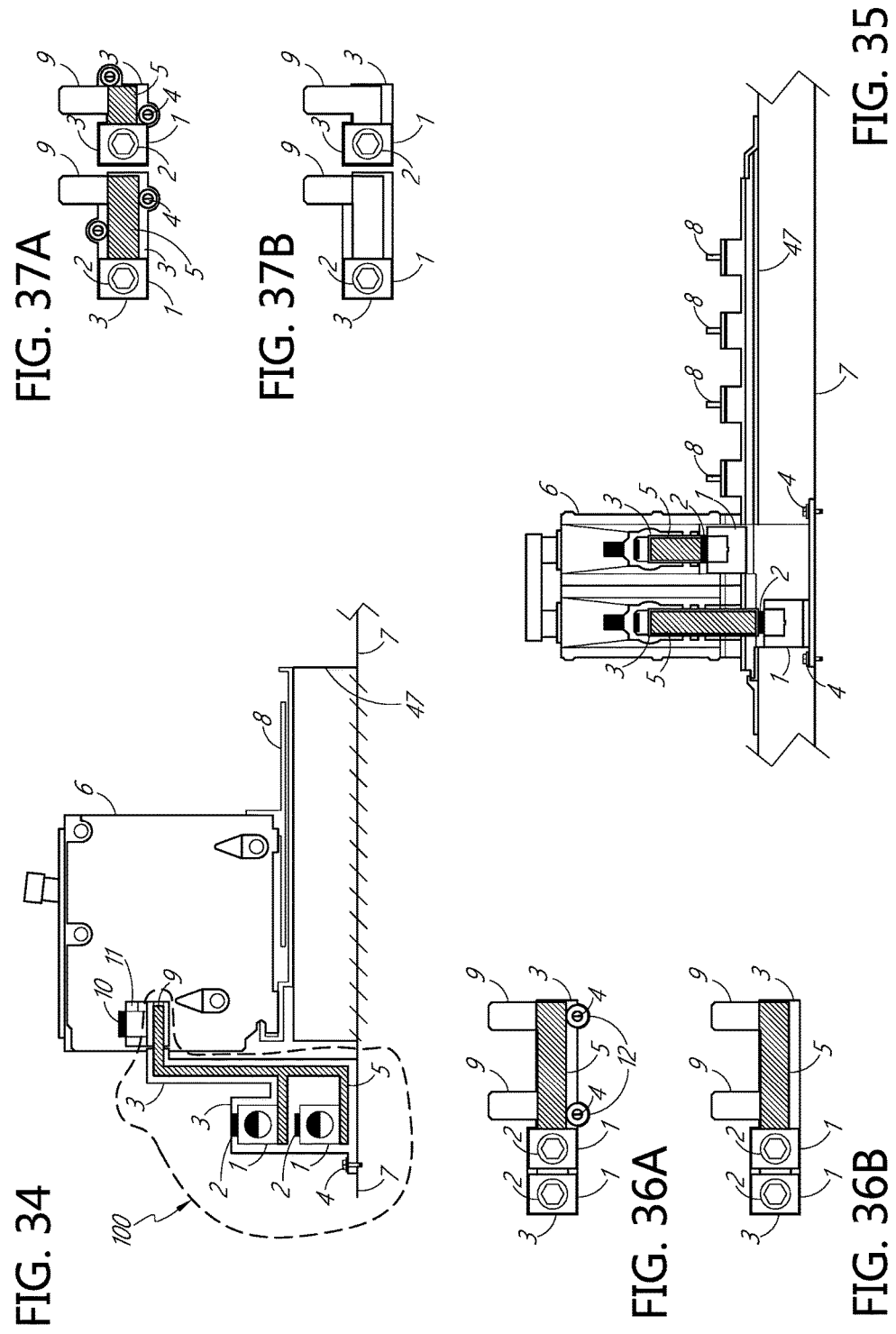

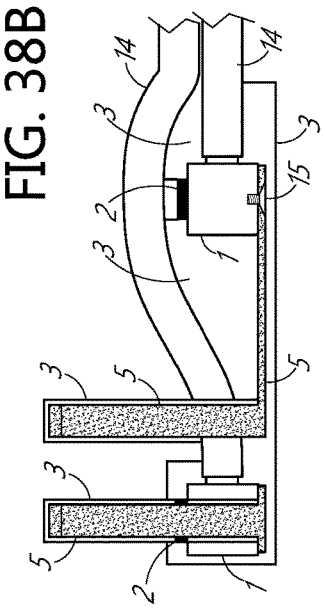
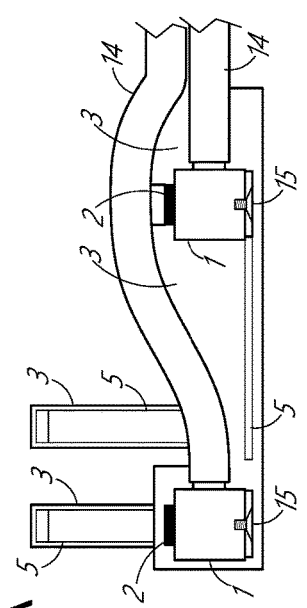
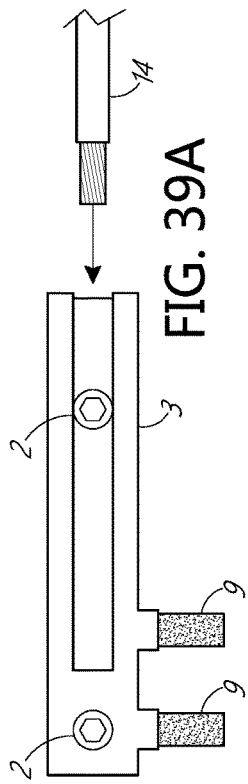
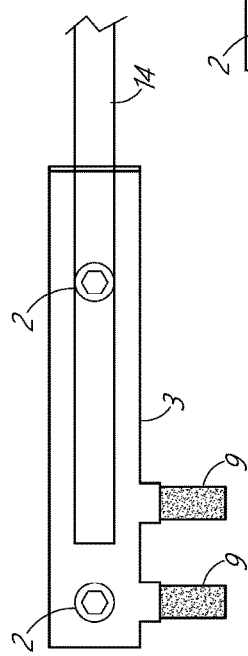

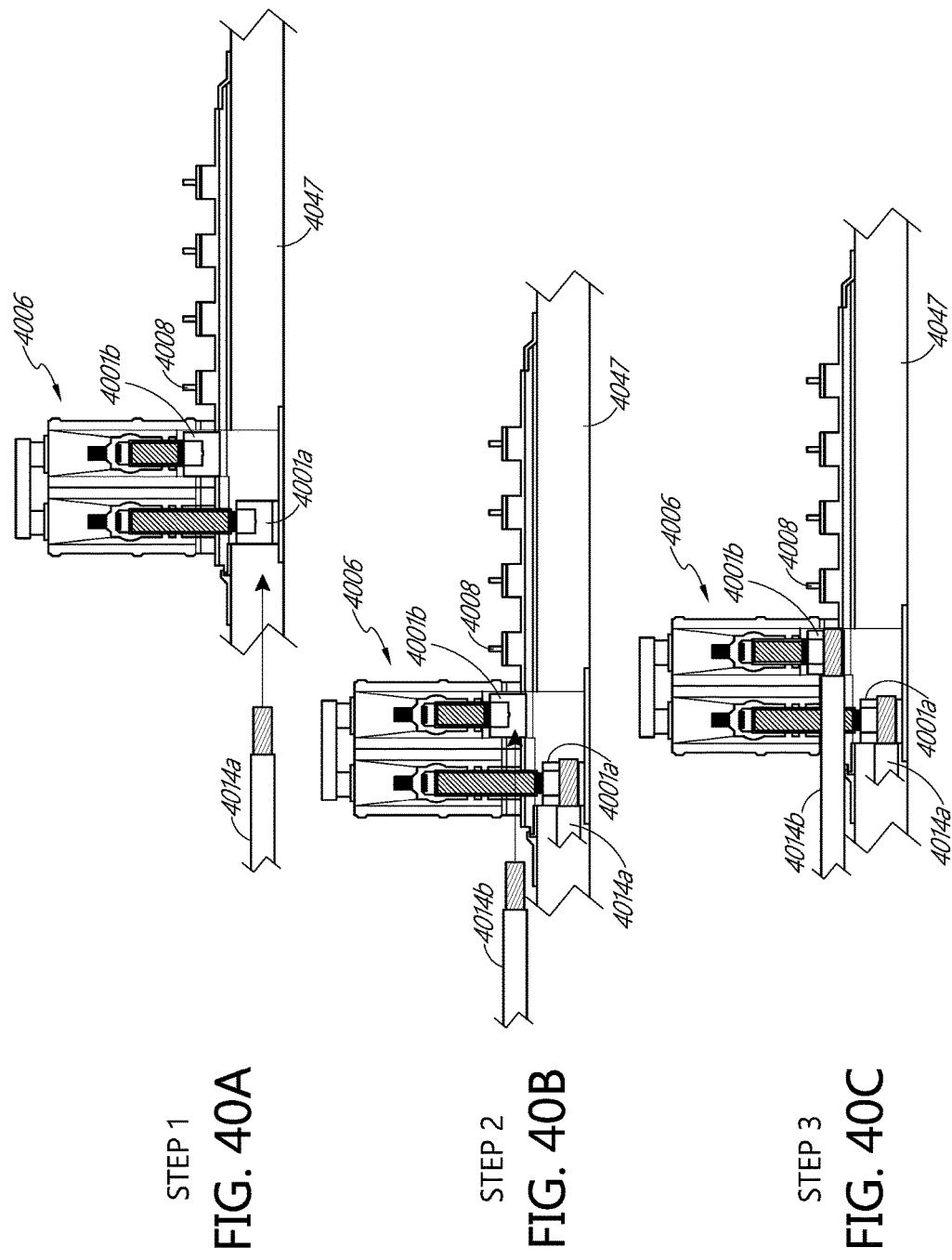

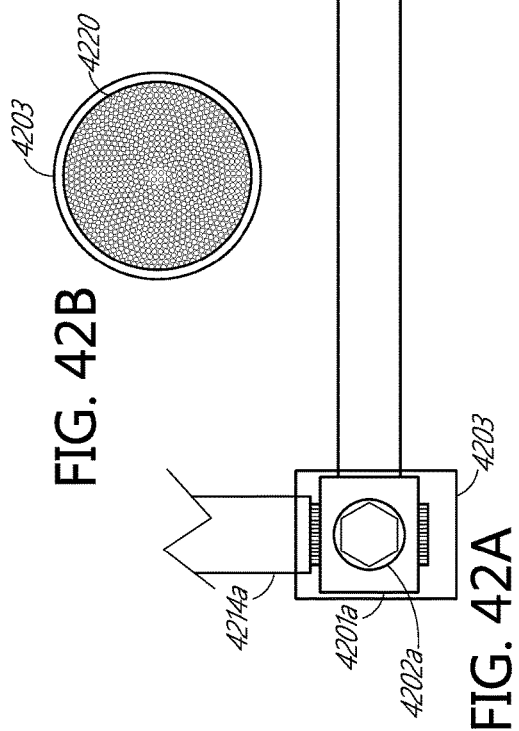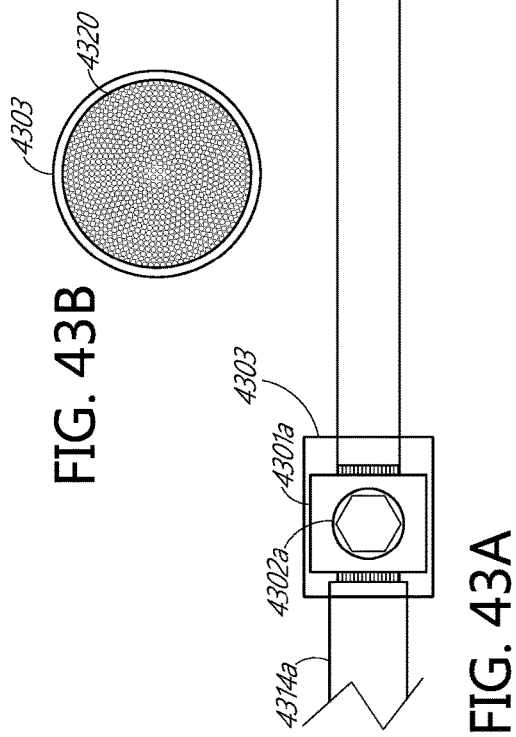

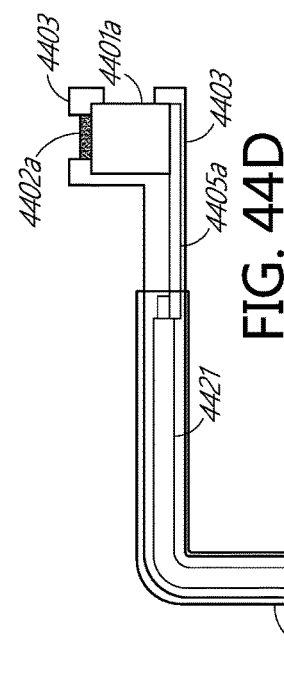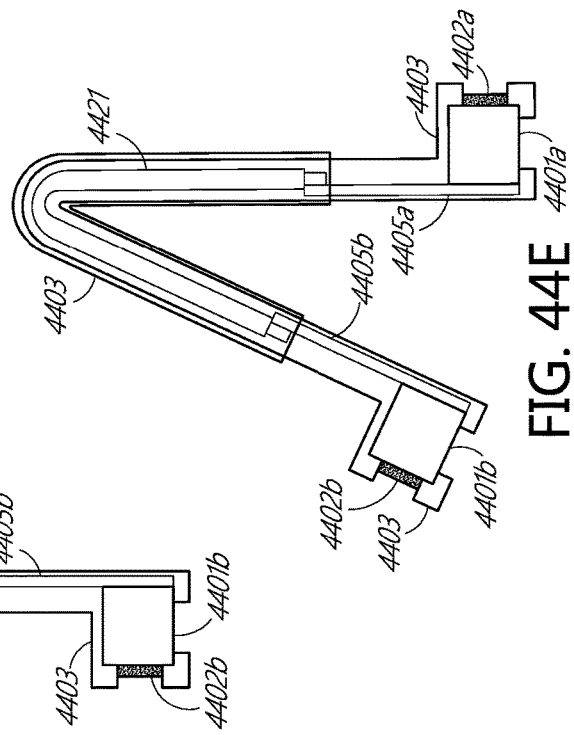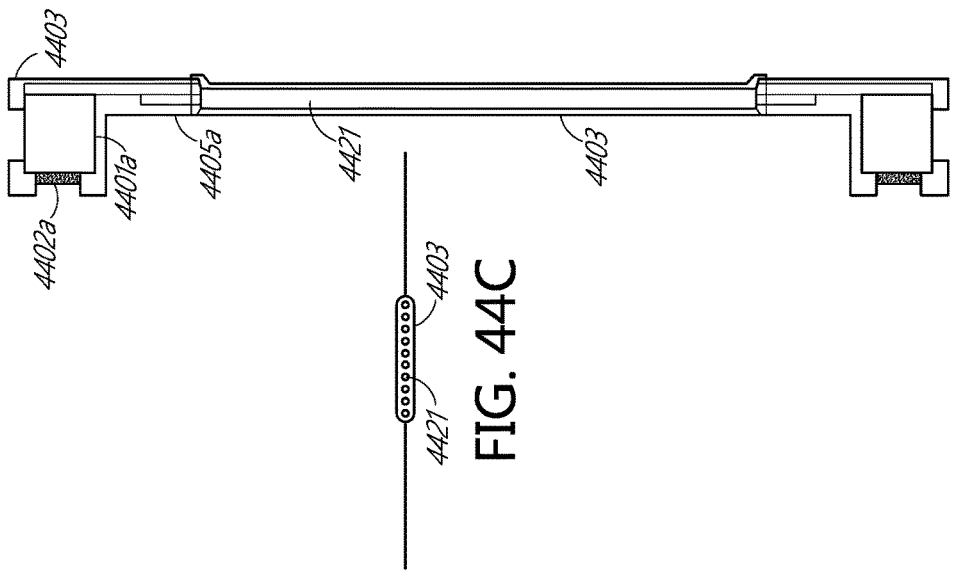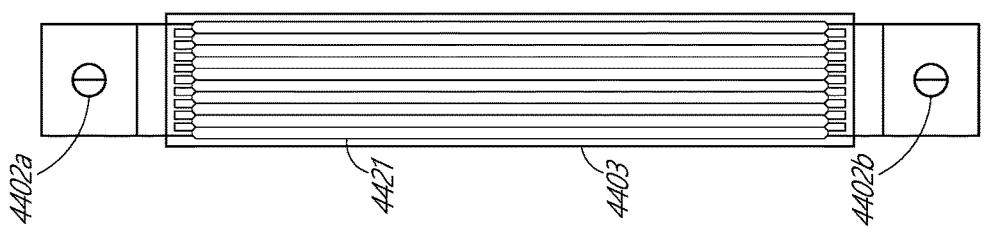

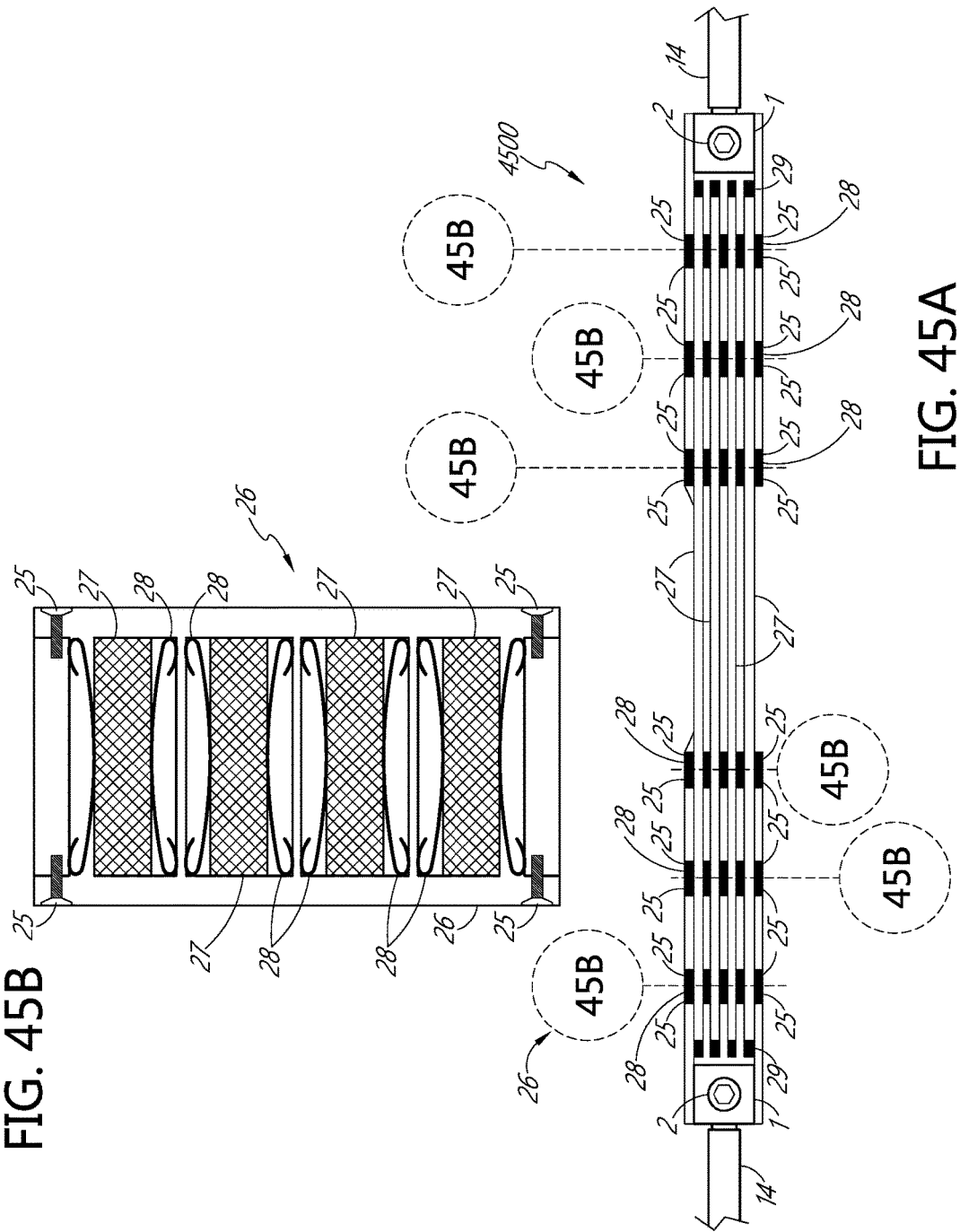

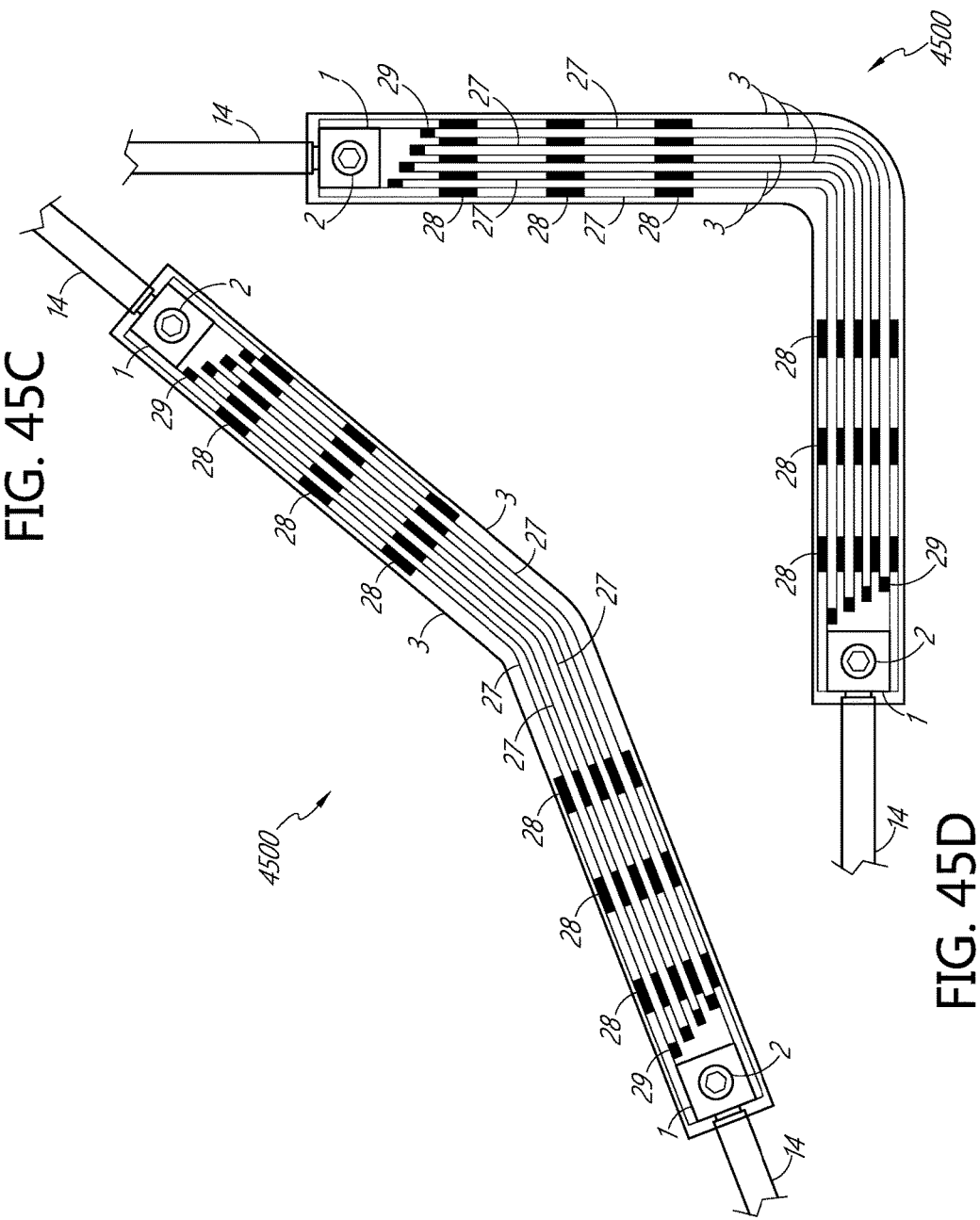

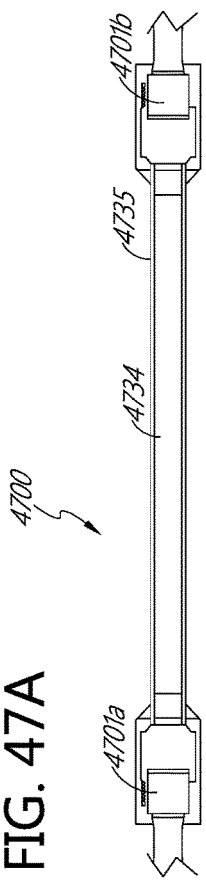
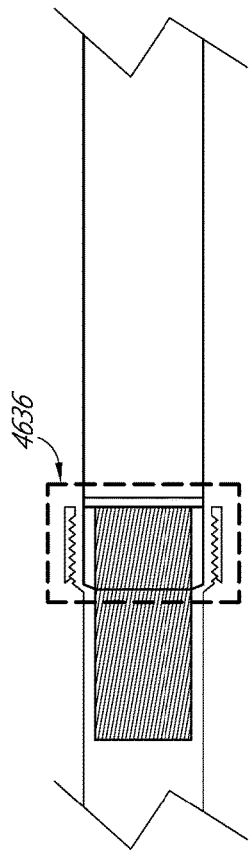
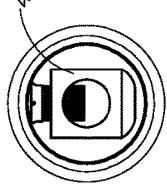
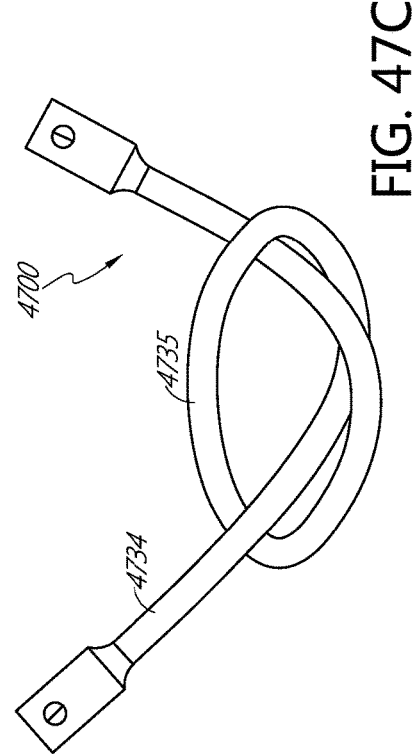
FIG. 47A
FIG. 46
FIG. 47B
FIG. 47C

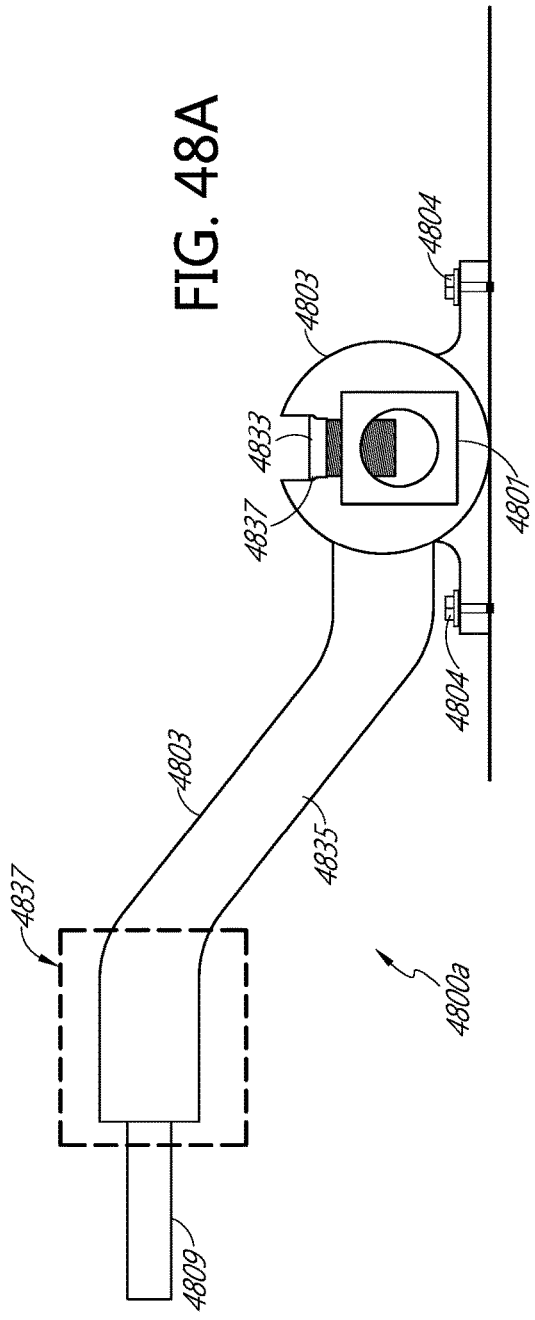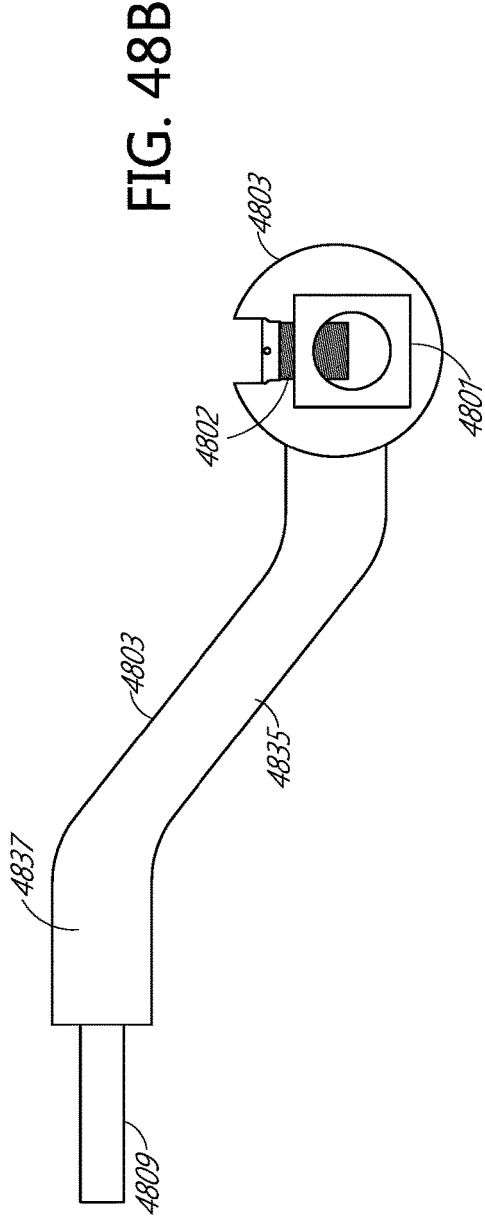

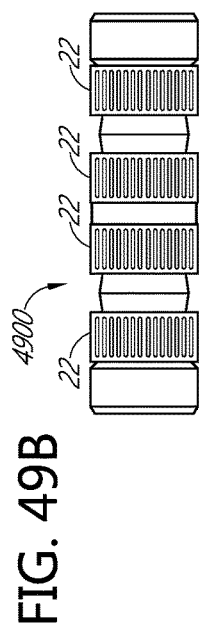
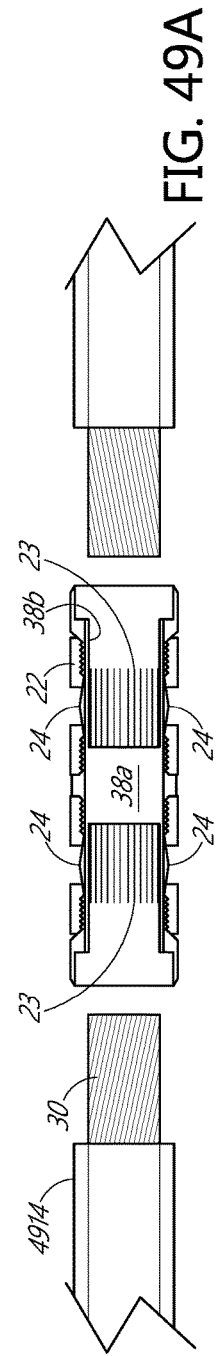
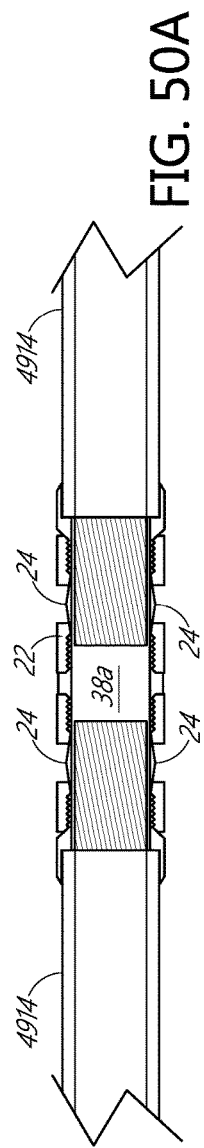
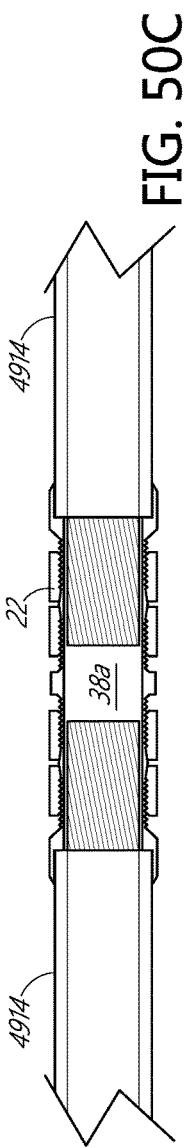
FIG. 49B
FIG. 49A
FIG. 50A
FIG. 50C

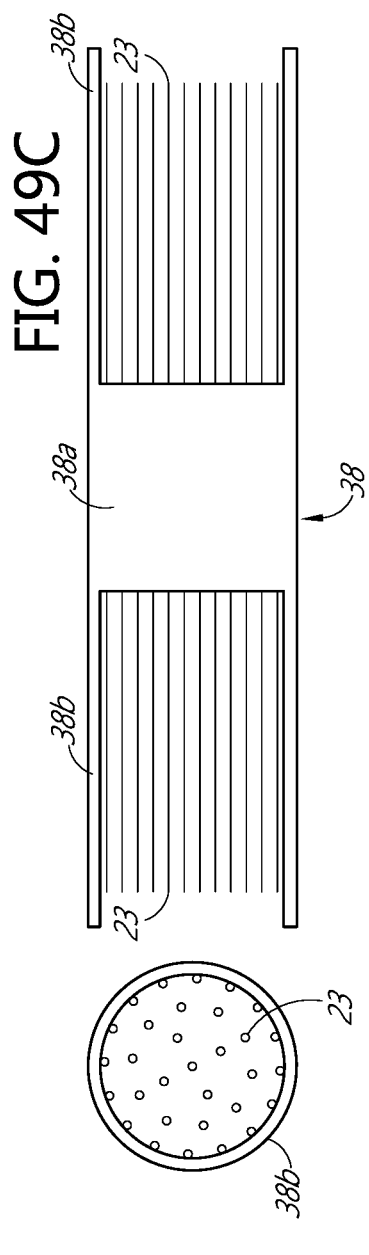
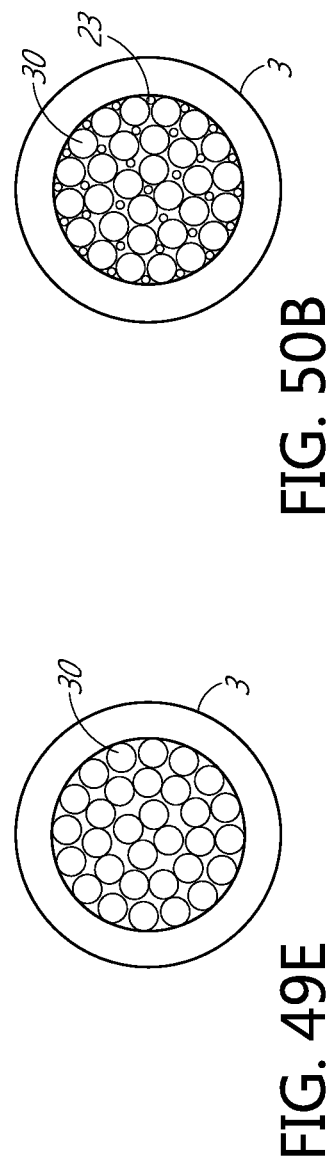
FIG. 49C
FIG. 49D
FIG. 49E
FIG. 50B

BEND RADIUS ADAPTERS AND METHODS OF FORMING SAME

CROSS-REFERENCE TO RELATED APPLICATIONS

This application claims the benefit of U.S. Provisional Application No. 62/283,897, filed Sep. 14, 2015, entitled BEND RADIUS ADAPTERS AND METHODS OF FORMING SAME, which is hereby incorporated by reference in its entirety.

BACKGROUND

Embodiments described herein relate to electrical components, and some particular embodiments relate to structures which can be used to safely and securely connect low-gauge, high-diameter electrical wiring within electrical systems.

SUMMARY

Some embodiments relate to a bend radius adapter, including a rigid power transfer bar extending between a first end and a second end; an insulating sleeve surrounding at least a portion of the power transfer bar; a first connection point adjacent the first end of the power transfer bar, the first connection point configured to allow an electrical connection between the power transfer bar and a first wire in a first orientation; and second connection point adjacent the second end of the power transfer bar, the second connection point configured to allow an electrical connection between the power transfer bar and a second wire in a second orientation, the second orientation different than the first orientation.

The adapter can additionally include at least one securement feature electrically isolated from the bent conductive structure. The at least one securement structure can include an aperture extending through a laterally extending portion of the insulating sleeve. The at least one securement feature cam include an insulated aperture extending through a portion of the power transfer bar.

At least one of the first connection point and the second connection point can include an electrical lug having a compression screw, the electrical lug being configured to retain a portion of the first wire or second wire and place the first wire or second wire in electrical communication with the power transfer bar. The first connection point can include the electrical lug configured to receive a portion of a wire extending in a first direction, and the second connection point can include a second electrical lug configured to receive a portion of the second wire extending in a second direction, the first and second directions being substantially perpendicular to one another.

At least one of the first connection point and the second connection point can include a portion of the power transfer bar not covered by the insulating sleeve. The portion of the power transfer bar not covered by the insulating sleeve can include an insertion prong. The insertion prong can be dimensioned and shaped to be inserted into a lug of a circuit breaker.

The power transfer bar can include a conductive core and a plurality of prongs extending in two separate directions from the conductive core, each of the plurality of prongs in electrical communication with one another via the conductive core. The first wire can include a plurality of conductive strands, and a first subset of the plurality of conductive prongs can be configured to be inserted between the conductive strands of the first wire, and the adapter can additionally include a compressive sleeve structure configured to compress at least a portion of the first wire through which the first subset of the plurality of conductive prongs extend.

The power transfer bar can include a bent portion, and a degree of bending in the bent portion of the power adapter can exceed a minimum bend radius of an equivalent electric wire.

Some embodiments relate to an adjustable bend radius adapter, comprising a power transfer path extending between a first end and a second end, at least a portion of the power transfer path being adjustable to vary an amount of bending in the power transfer path; an insulating sleeve surrounding at least a portion of the power transfer path; a first connection point adjacent the first end of the power transfer path, the first connection point configured to allow an electrical connection between the power transfer path and a first wire in a first orientation; and a second connection point adjacent the second end of the power transfer path, the second connection point configured to allow an electrical connection between the power transfer path and a second wire in a second orientation, the second orientation different than the first orientation.

The power transfer path can include at least two rigid power transfer bars connected by a rotatable joint. The rotatable joint can include facing sections of the at least two rigid power transfer bars, the facing sections comprising interlocking radially-extending teeth, and an adjustment screw extending through at least a portion of the facing sections of the at least two rigid power transfer bars. The adapter can additionally include a third rigid power transfer bar and a second rotatable joint, wherein the third rigid power transfer bar extends between the first and second rotatable joints.

The adapter can additionally include a first rigid power transfer bar section adjacent the first end of the power transfer path; a second rigid power transfer bar section adjacent the second end of the power transfer path; and a plurality of flexible wires encased within the insulating sleeve and extending between the first rigid power transfer bar section and the second rigid power transfer bar section. The plurality of flexible wires can have diameters of less than 0.5 millimeters, or less than 0.01 millimeters.

A portion of the power transfer path can include a hollow tube filled with a deformable conductive material. The deformable conductive material can include a liquid or a powder.

The first connection point can include an electrical lug. The second connection point can include an insertion prong.

BRIEF DESCRIPTION OF THE DRAWINGS

FIG. 19 is a top view of a bend radius adapter with integral securement features.

FIG. 20 is a top view of another embodiment of a bend radius adapter with integral securement features.

FIG. 23A is a top view of another embodiment of an adjustable bend radius adapter having multiple articulation points.

FIG. 23B is a schematic cross-sectional view which schematically illustrates the adjustable bend radius adapter of FIG. 23A.

FIG. 25A is a detailed front view of a bend radius adapter having orthogonally-oriented lugs, such as the bend radius adapter of FIG. 24B.

FIG. 25B is a side view of the bend radius adapter of FIG. 25A.

FIG. 26 is a detailed side view of an adapter including two axially-aligned electrical lugs.

FIG. 27A is a side view of a bend radius adapter including an electrical lug on a first side and an insertion prong on a second side.

FIG. 27B is a detailed view of the compression screw of the bend radius adapter of FIG. 27A.

FIG. 28 is a side cross-section of a bend radius adapter similar to the bend radius adapter of FIG. 27A, illustrating the electrical connection between an inserted cable and the power transfer bar.

FIGS. 30A-30C illustrate side views of various embodiments of circuit breakers having bend radius adapters installed.

FIG. 31A is a front view of a bend radius adapter having two electrical lugs 1, each of which have a section of a main power cable 14 installed therein.

FIG. 31B is a top view of the bend radius adapter of FIG. 31A, without the power cables installed in the lugs.

FIGS. 32A-32C illustrate side views of various embodiments of circuit breakers having bend radius adapters installed.

FIG. 33A is a top plan view of an embodiment of a pair of bend radius adapters.

FIG. 33B is a top plan view of an alternative embodiment of a pair of bend radius adapters.

FIG. 34 is a side view of an embodiment of a circuit breaker having bend radius adapters installed.

FIG. 35 is a front view of a circuit breaker and bend radius adapters similar to that of FIG. 34.

FIG. 36A is a top plan view of a bend radius adapter including a pair of electrical lugs and a pair of insertion prongs.

FIG. 36B is a top plan view of a bend radius adapter similar to that of FIG. 36A.

FIG. 37A is a top plan view of a pair of bend radius adapters, each including an electrical lug and an insertion prong.

FIG. 37B is a top plan view of a pair of bend radius adapters similar to that of FIG. 37A.

FIG. 38A is a side view of a bend radius adapter including pair of electrical lugs and a pair of power transfer bars which terminate in insertion prongs.

FIG. 38B is a cross-sectional side view of a bend radius adapter similar to the bend radius adapter of FIG. 38A.

FIGS. 39A-39F illustrate various views during a process of installing main power cables in the electrical lugs of a bend radius adapter similar to the bend radius adapters of FIGS. 38A and 38B.

FIGS. 40A-40C are front views of various stages in a process of installing main power cables in the electrical lugs of a bend radius adapter similar to the bend radius adapter of FIG. 35B.

FIG. 42A is a side view of another embodiment of a flexible bend radius adapter, and FIG. 42B is a cross-sectional view of the flexible bend radius adapter of FIG. 42A, taken along the line B-B.

FIG. 43A is a side cross-sectional view of another embodiment of a flexible bend radius adapter, and FIG. 43B is a cross-sectional view of the flexible bend radius adapter of FIG. 43A, taken along the line B-B.

FIG. 44A is a front cross-sectional view of another embodiment of a flexible bend radius adapter, FIG. 44B is a side-cross-sectional view of the flexible bend radius adapter of FIG. 44A, and FIG. 44C is a cross-sectional view of the flexible bend radius adapter of FIG. 44A, taken along the line C-C.

FIG. 44D is a side view of the flexible bend radius adapter of FIG. 44A in a first bent position, and FIG. 44E is a side view of the flexible bend radius adapter of FIG. 44A in a second bent position.

FIG. 45A is a cross-sectional view of another embodiment of a flexible bend radius adapter.

FIG. 45B is a detailed cross-sectional view of one of the bend radius adapter sub-assemblies disposed throughout the flexible bend radius adapter of FIG. 45A.

FIG. 45C is a side view of the flexible bend radius adapter of FIG. 45A in a first bent position, and FIG. 45D is a side view of the flexible bend radius adapter of FIG. 45A in a second bent position.

FIG. 46 is a side cross-sectional view of a waterproof collar that can be tightened to make a portion of a bend radius adapter waterproof.

FIG. 47A is a side cross-section of an embodiment of a flexible bend radius adapter which includes liquid or powdered conducting material.

FIG. 47B is an axial view of the flexible bend radius adapter of FIG. 47A.

FIG. 47C depicts the flexible bend radius adapter of FIG. 47A in a bent position.

FIG. 48A is a side view of an embodiment of a bend radius adapter including a flexible section.

FIG. 48B is a side view of another embodiment of a bend radius adapter including a flexible segment.

FIG. 49A is an exploded schematic view of two sections of stranded electrical cable and a compressive sleeve connector for joining the two.

FIG. 49B is a top plan view of the compressive sleeve connector of FIG. 49A.

FIG. 49C is a detailed cross-sectional view of the interior structure of the connector of FIG. 49A.

FIG. 49D is an axial cross-sectional view of the outer section of the connector of FIG. 49A.

FIG. 49E is an axial view of the stranded electrical cable.

FIG. 50A-50C illustrate various views of a process for connecting two stranded cables using the compressive sleeve connector of FIG. 49A.

DETAILED DESCRIPTION

Installation and upgrading of electrical panels and associated components can involve the routing of low-gauge wiring through existing panels, conduits, and other components. In particular, when work on an electrical panel involves adding or replacing components, the routing of replacement or addition of low-gauge wiring can be made difficult by the confined space within the panel or other existing structures, and the constraints on the placement and routing of the thick wiring due to existing components.

There are limitations to the amount of bending to which such low-gauge wiring under large current loads can be subjected. In addition to constraints on the amount of bending, such low-gauge wiring may require substantial support to safely retain the low-gauge wiring in place under heavy current load. Some embodiments discussed herein related to the use of bend radius adapters which can provide conductive connections at a wide range of bend angles, or which can provide structural support for low-gauge wiring to allow for shaper bends in the high-gauge wiring.

Figure 1:
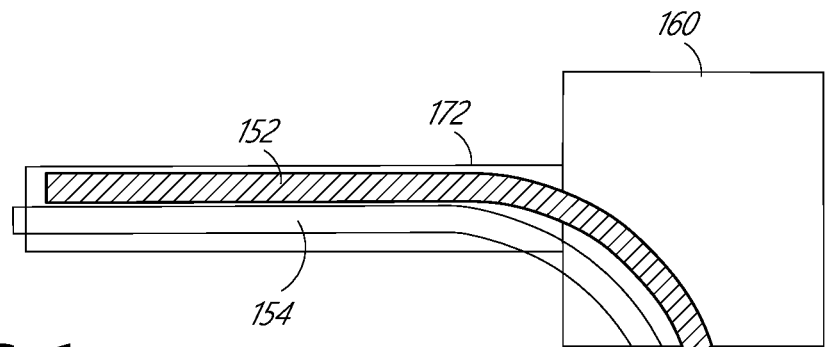
FIG. 1 illustrates the routing of a large-diameter insulated electrical wire or cable through a junction box.

FIG. 1 illustrates the routing of a large-diameter insulated electrical wire or cable 152 (in dashed lines) from a vertically oriented conduit 170 into a junction box 160, then out of the junction box 160 into a horizontally oriented conduit 122. The curvature of the large-diameter insulated electrical wire or cable 152 is constrained not only by the physical ability of the large-diameter insulated electrical wire or cable 152 to bend, but also by minimum bend radius safety standards used to ensure the integrity of installed large-diameter insulated electrical wires or cables. These bend radius standards require a larger minimum bend radius with increasing outer diameter of the large-diameter insulated electrical wire or cable 152, in order for a given bend to comply with applicable electrical codes. Although various embodiments described herein may refer to the use of wires or cables, they can be used with any suitable conductive structure, including but not limited to wires and cables.

Because of the limited space within existing electrical conduits 170 and 172 and junction box 160, it may not be possible to route an additional large-diameter insulated electrical wire or cable 154 within the existing electrical conduits 170 and 172 and junction box 160, and still comply with the minimum bend radius safety standards. Such an addition may require, for example, the replacement of junction box 160 with a larger junction box, increasing the cost and complexity of the installation of additional large-diameter insulated electrical wire or cable 154.

Figure 2:
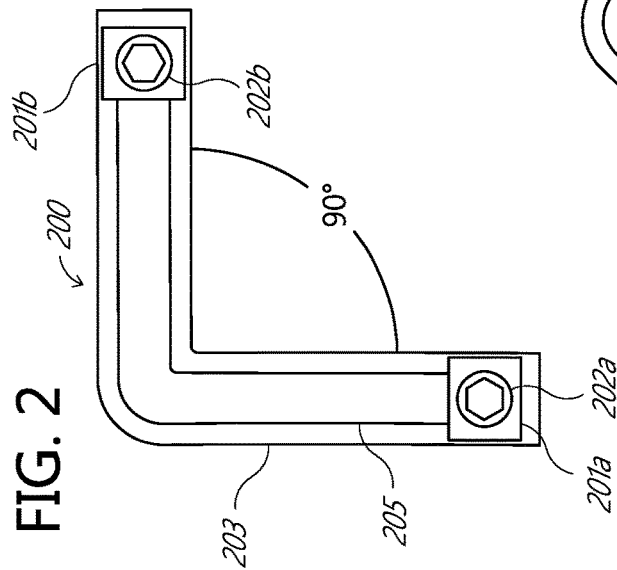
FIG. 2 illustrates a top view of a bend radius adapter that includes a bent conductive structure.

FIG. 2 illustrates a top view of a bend radius adapter 200 that includes a bent conductive structure in the form of power transfer bar 205 extending between a first end and a second end. In the illustrated embodiment, the first end of the bend radius adapter 200 includes a first electrical lug 201a, the first electrical lug 201a being configured to allow electrical connection between a portion of the power transfer bar 205 adjacent the first electrical lug 201a and a first wire (not shown) inserted into the first electrical lug 201a. A compression screw 202a can be used to secure the first wire within the first electrical lug 201a, and press a section of the first wire against a section of the power transfer bar 205. Similarly, the second end of the bend radius adapter 200 includes a second electrical lug 201b having a compression screw 202b, the second electrical lug 201b being configured to allow electrical connection between a portion of the power transfer bar 205 adjacent the second electrical lug 201b and a second wire (not shown) inserted into the second electrical lug 201b. At least the power transfer bar 205 is encapsulated in an insulating sleeve material 203. In other embodiments, some or all of the first and second electrical lugs 201a and 201b are also encapsulated in an insulating sleeve material 203.

The insulating sleeve material 203 may be, for example, an Underwiters' Laboratory (UL) approved electrical insulation material, or an insulation material formed by any other electrical standards-setting organization. In an embodiment such as the bend radius adapter 200, where the conductive structure is a rigid power transfer bar 205, the electrical insulation material used to form the insulating sleeve 203 may in some embodiments be hard, inflexible, and shaped by molding, casting, and/or CNC milling or any other suitable process. In other embodiments discussed herein, an insulating material may cover a flexible portion of a bend radius adapter, and a more flexible insulating material may be used, which may be sufficiently pliable to allow positioning of components as needed.

In the illustrated embodiment, the angle between the sections of the power transfer bar 205 at the first end and the second end of the bend radius adapter 200 is roughly 90 degrees, although in various embodiments a wide number of other angles may be used. For example, in other embodiments, the angle may be 22.5°, 45°, 67.5°, 112.5°, 135°, 157.5°, or any other desired angle between 0° and 180°. The bent sections of the power transfer bar 205 can include a degree of bending in the bent portion of the power adapter which can exceed a minimum bend radius of a low-gauge electric wire configured with a similar load rating. Because the power transfer bar can be formed in the desired shape, rather than being bent into the desired shape while encased in an insulator, as the bent electrical wire of FIG. 1, there is substantially greater flexibility in the range of bending and resultant shapes which can be formed and utilized safely in an electrical system.

The power transfer bar 205 can be formed from or include any suitable conductive material, including but not limited to metals such as copper, aluminum, brass, bronze, stainless steel, titanium, or silver, although a wide variety of other materials may also be used. The power transfer bar 205 can be formed via any suitable manufacturing process, including but not limited to, molding or casting of molten metal, stamping, water jetting, or laser cutting desired shapes from a larger piece of conductive material. A wide variety of desired shapes and sizes of conductive components can be formed in such a manner, including variations in length, width, thickness and angular orientation. In some embodiments, the power transfer bar 205 may not be a rigid structure, but may instead be a length of flexible wire or cable, imbuing the bend radius adapter with corresponding flexibility.

Figure 3:
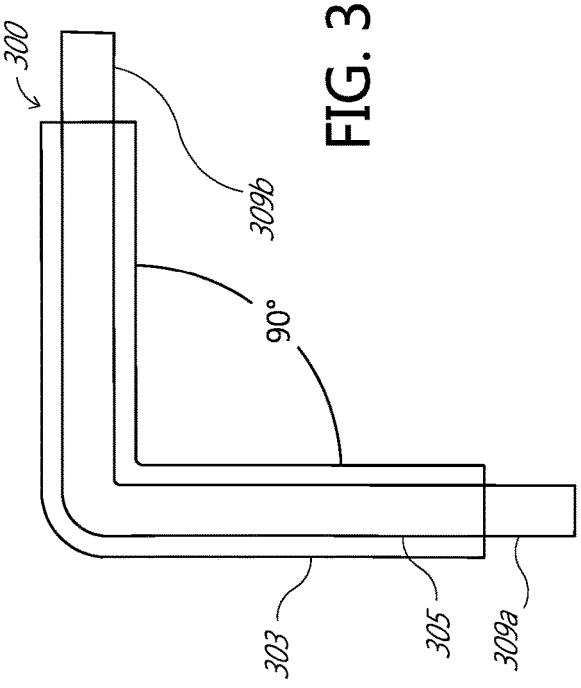
FIG. 3 illustrates a top view of another embodiment of a bend radius adapter.

FIG. 3 illustrates a top view of another embodiment of a bend radius adapter. The bend radius adapter 300 is similar in some respects to the bend radius adapter 100 depicted in FIG. 2, but differs at least in that the first end of the bend radius adapter 200 terminates in a first insertion prong 309a (alternately referred to as a load transfer prong), instead of the electrical lug 201a of bend radius adapter 200. Similarly, the second end of the bend radius adapter 300 terminates in a second insertion prong 309b, instead of the electrical lug 201b of bend radius adapter 200. In the illustrated embodiment, the insertion prongs 309a and 309b are exposed portions of the power transfer bar 305, but in other embodiments, the insertion prongs 309a and 309b may be separate structures in at least electrical communication with the power transfer bar 305. In other embodiments, a structure such as the insertion prong 309a or 309b can be connected to a conductor, wire, or cable via soldering, a fastening screw, or compressive physical contact which may form a friction fit.

In some embodiments, the first insertion prong 309a of the bend radius adapter 300 may be inserted into and secured within an electrical lug of a circuit breaker (not shown), and the second insertion prong 309b of the bend radius adapter 300 may be placed in electrical communication with electrical wire connected to a load (not shown), via soldering, crimping, or any other suitable manner of connecting an electrical wire to the insertion prong 309b. As discussed in greater detail herein, the bend radius adapter 300 can be used to connect load lines to one or more circuit breakers inside a main service panel or elsewhere, without violating the requirements imposed by bend radius standards. The various types of bend radius adapters discussed herein can provide a wide range of connection paths and patterns without violating the requirements imposed by bend radius standards, giving an electrician or other installer a significant amount of flexibility in working within the structural constraints provided by preexisting panels, junction boxes, panels or other components of an electrical system.

Figure 4:
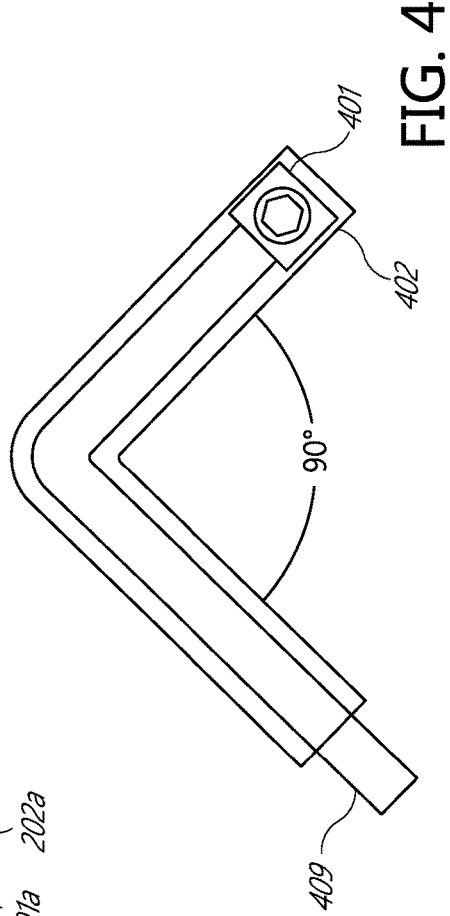
FIG. 4 illustrates a top view of another embodiment of a bend radius adapter.

FIG. 4 illustrates a top view of another embodiment of a bend radius adapter. The bend radius adapter 400 is similar in some respects to the bend radius adapter 400 depicted in FIG. 3. The second end of the bend radius adapter 400 terminates in an insertion prong 409, just as the second end of the bend radius adapter 300 terminates in an insertion prong 309b. However, bend radius adapter 300 differs from bend radius adapter 300, at least in that the first end of the bend radius adapter 400 terminates in an electrical lug 401 having a compression screw 402, instead of in the first insertion prong 309a of bend radius adapter 300.

While the bend radius adapters of FIGS. 2-4 illustrate some exemplary variations of connectors at each end of the bend radius adapters, any suitable connection structure may be provided at either end of the bend radius adapters, and various embodiments of bend radius adapter may include any type and number of appropriate connection structures.

Figure 5:
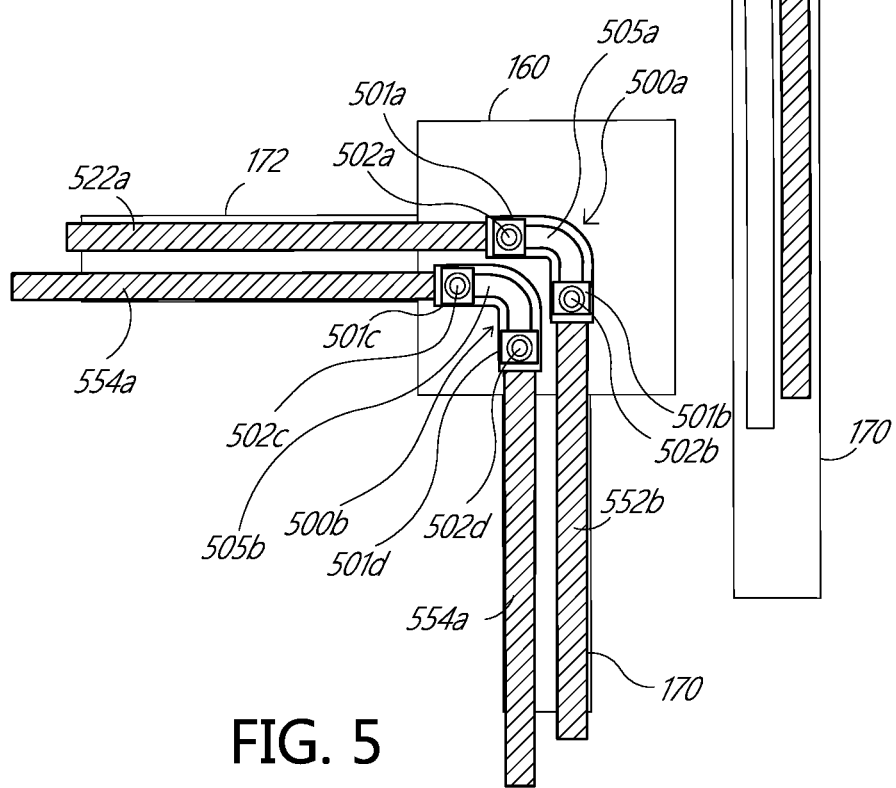
FIG. 5 illustrates the use of bend radius adapters to more efficiently route low-gauge wiring through existing electrical system structures.

FIG. 5 illustrates the use of bend radius adapters to more efficiently route low-gauge wiring through existing electrical system structures. In FIG. 5, two bend radius adapters 500a and 500b have been placed inside the junction box 160 of FIG. 1, and used to route two low-gauge electrical cables through the existing junction box 160 and conduits 170 and 172. The bend radius adapters 500a and 500b are similar to the bend radius adapters 200 of FIG. 2, in that the bend radius adapter 500a has a first electrical lug 501a on a first end and a second electrical lug 501b on a second end, and the bend radius adapter 500b has a first electrical lug 501c on a first end and a second electrical lug 501d on a second end. The bend angle of the bend radius adapter is roughly 90 degrees, but any suitable bend angle may be used.

A portion of a first low-gauge electrical cable 552a extending through the horizontally-oriented conduit 172 is routed into the junction box 160 and inserted into the electrical lug 501a of bend radius adapter 500a, and secured in place using compression screw 502a. Similarly, a portion of a second low-gauge electrical cable 552b extending through the vertically-oriented conduit 170 is routed into the junction box 160 and inserted into the electrical lug 501b of bend radius adapter 500a, and secured in place using compression screw 502b. An electrical connection is thus formed between the portions 552a and 552b of low-gauge electrical cable, and the bend radius adapter 500a includes a smaller bend radius then would be possible by bending a single low-gauge electrical cable, as depicted in FIG. 1. In some implementations, inserting a portion of the low-gauge electrical cables can include stripping the low-gauge electrical cables of surrounding insulation before inserting them into the electrical lugs, allowing the compression screws to press the exposed conductive material against the power transfer bar 505a to form an electrical connection between the low-gauge electrical cables and the power transfer bar 505a.

A portion of a second low-gauge electrical cable 554a extending through the horizontally-oriented conduit 172 is routed into the junction box 160 and inserted into the electrical lug 501c of bend radius adapter 500b, and secured in place using compression screw 502c. Similarly, a portion of a second low-gauge electrical cable 554b extending through the vertically-oriented conduit 170 is routed into the junction box 160 and inserted into the electrical lug 501d of bend radius adapter 500b, and secured in place using compression screw 502d. The additional space provided by the sharper bend of the bend radius adapter 500a allows the routing of a second low-gauge electrical cable through the existing junction box 160 and conduits 170 and 172, when regulatory, safety, or other constraints on the minimum bend radius of the low-gauge electrical cable would otherwise make routing multiple low-gauge cables through the existing junction box 160 and conduits 170 and 172 difficult, impractical, or even impossible.

Figure 6:
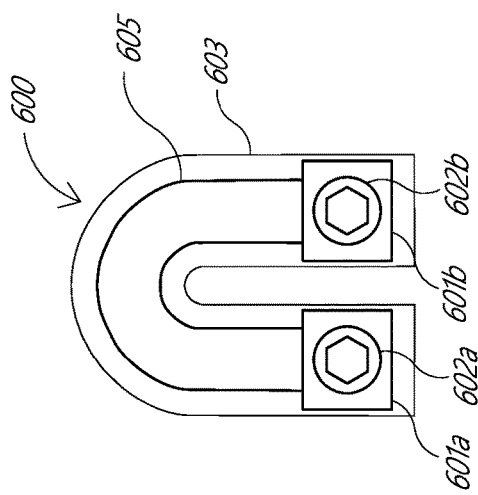
FIG. 6 illustrates a top view of a bend radius adapter that includes a U-shaped conductive structure.

FIG. 6 illustrates a top view of a bend radius adapter that includes a U-shaped conductive structure. The bend radius adapter 600 includes a U-shaped conductive structure in the form of power transfer bar 605 extending between a first end and a second end of the bend radius adapter. In the illustrated embodiment, the first end of the bend radius adapter 600 includes a first electrical lug 601a, the first electrical lug 601a being configured to allow electrical connection between a portion of the power transfer bar 605 adjacent the first electrical lug 601a and a first wire (not shown) inserted into the first electrical lug 601a. A compression screw 602a can be used, for example, to secure the first wire within the first electrical lug 601a, and press a section of the first wire against a section of the power transfer bar 605. Similarly, the second end of the bend radius adapter 600 includes a second electrical lug 601b having a compression screw 602b, the second electrical lug 601b being configured to allow electrical connection between a portion of the power transfer bar 5 adjacent the second electrical lug 601b and a second wire (not shown) inserted into the second electrical lug 601b. At least the power transfer bar 605 is encapsulated in an insulating sleeve material 3. In other embodiments, some or all of the first and second electrical lugs 601a and 601b are also encapsulated in an insulating sleeve material 603.

Figure 7:
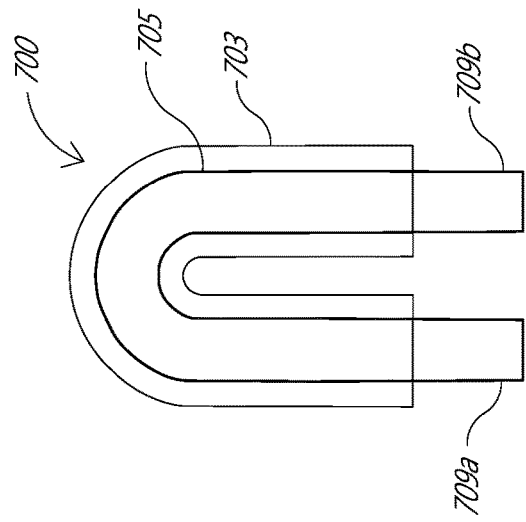
FIG. 7 illustrates a top view of another embodiment of a bend radius adapter.

FIG. 7 illustrates a top view of another embodiment of a bend radius adapter. The bend radius adapter 700 is similar in some respects to the bend radius adapter 600 depicted in FIG. 6, but differs at least in that the first end of the bend radius adapter 700 terminates in a first insertion prong 709a (alternately referred to as a load transfer prong), instead of the electrical lug 601a of bend radius adapter 600. Similarly, the second end of the bend radius adapter 700 terminates in a second insertion prong 709b, instead of the second electrical lug 601b of bend radius adapter 600. In the illustrated embodiment, the insertion prongs 709a and 709b are exposed portions of the power transfer bar 305, but in other embodiments, the insertion prongs 709a and 709b may be separate structures in at least electrical communication with the power transfer bar 705.

In some embodiments either or both the first insertion prong 709a and the second insertion prong 709b of the bend radius adapter 700 may be placed in respective electrical communication with electrical wire connected to a load (not shown), via soldering, crimping, or any other suitable manner of connecting an electrical wire to either or both the first insertion prong 709a and the second insertion prong 709b.

Figure 8:
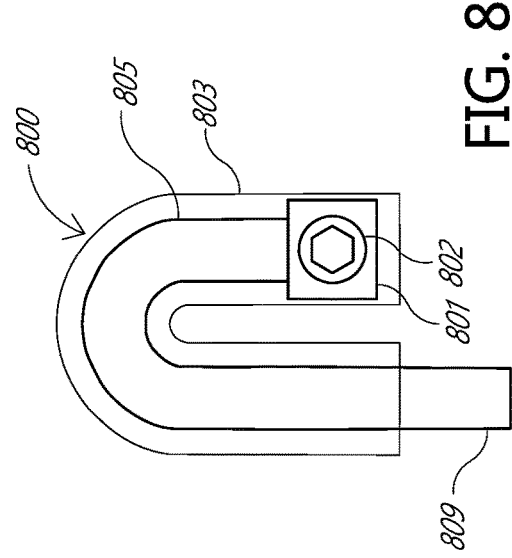
FIG. 8 illustrates a top view of another embodiment of a bend radius adapter.

FIG. 8 illustrates a top view of a bend radius adapter 800 that is similar in some respects to the bend radius adapter 700 depicted in FIG. 7. For example, the second end of the bend radius adapter 800 terminates in an insertion prong 809, just as the second end of the bend radius adapter 700 terminates in an insertion prong 709b. However, bend radius adapter 800 differs from bend radius adapter 700, at least in that the first end of the bend radius adapter 800 terminates in an electrical lug 801 having a compression screw 802, instead of in the first insertion prong 709a of bend radius adapter 700.

Bend radius adapters such as the bend radius adapters 600, 700, and 800 of FIGS. 6, 7, and 8, respectively, can be used to accomplish tight-radius bends (e.g., 180 degree U-bends). Such bends may be needed to address to structural constraints imposed by preexisting panels, junction boxes, panels or other components of an electrical system, but if attempted upon individual insulated electrical conductors, might violate the requirements imposed by existing minimum bend radius safety standards.

Figure 9:
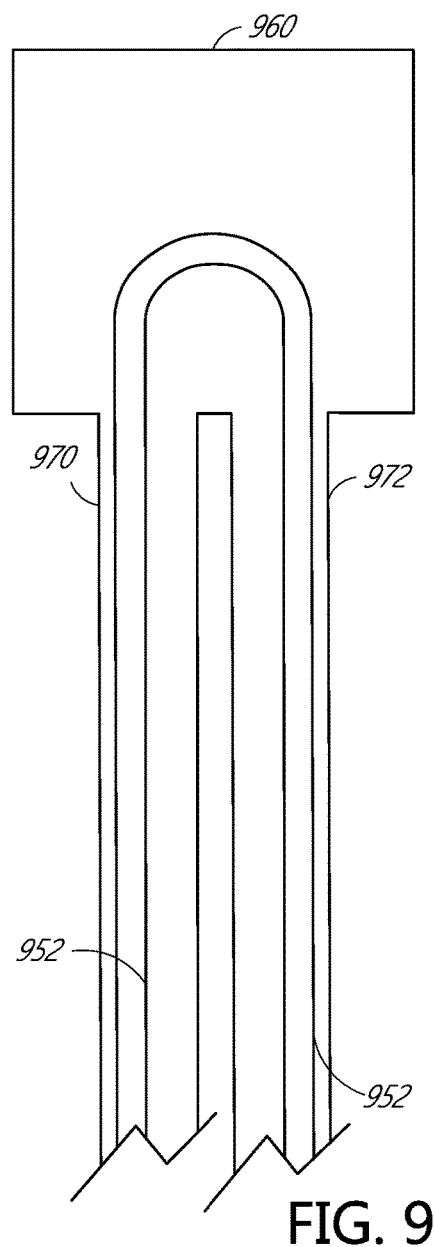
FIG. 9 illustrates a completed electrical installation including a U-shaped bend in a low-gauge electrical wire.

FIG. 9 illustrates a completed electrical installation including a U-shaped bend in a low-gauge electrical wire. In the completed electrical installation of FIG. 9, a large-diameter insulated electrical wire 952 has been routed up from a first vertically oriented conduit 970 into a junction box 960. A U-bend has been performed on the large-diameter insulated electrical wire 952 prior to its being routed downward into a second vertically-oriented conduit 972. In the illustrated embodiment, the U-bend in the large-diameter insulated electrical wire 952 exceeds the minimum bend radius of the wire 952. Such a problem may occur, for example, when existing wiring is replaced with lower-gauge, higher-thickness wiring within existing electrical system structures.

Thus, although the large-diameter insulated electrical wire 952 was physically able to be routed as described herein, the integrity of either or both of the insulation and conductive core comprising the large-diameter insulated electrical wire 952 has likely been compromised in the process by having been subjected to such a tight-radius U-bend. Installations such as that depicted in this figure often do not pass inspection because the vertically oriented conduits 970 and 972 are too close to one another, and the junction box 960 is not large enough, to allow the large-diameter insulated electrical wire 960 to be routed as shown without violating the requirements imposed by minimum bend radius safety standards. An inspection-compliant installation such as this may require, for example, the use of a larger junction box 970, or the relocation of one or both of the vertically-oriented conduits away from one another to increase the spacing therebetween, increasing the cost and complexity of the installation of the large-diameter insulated electrical wire 952.

Figure 10:
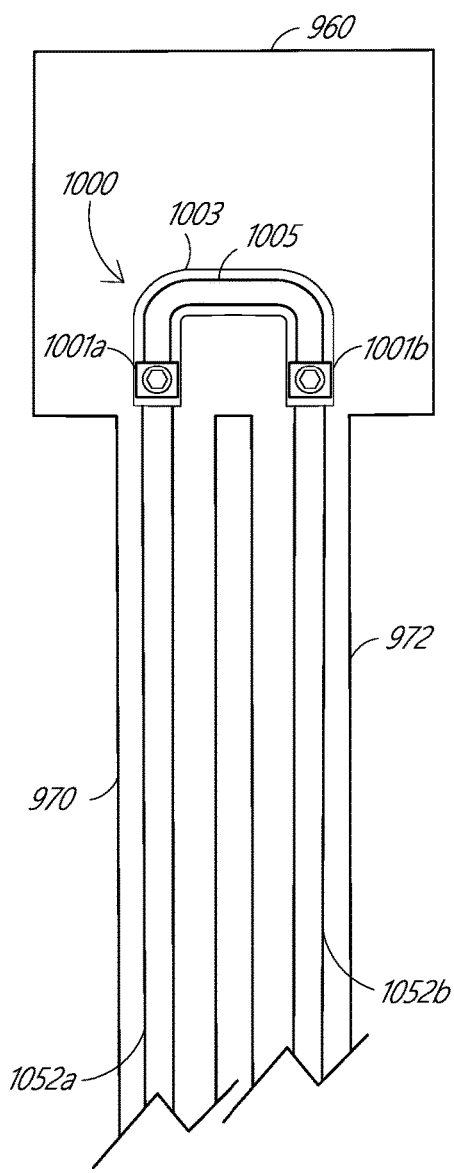
FIG. 10 illustrates a completed electrical installation in which a U-shaped bend radius adapter has been used instead of directly bending low-gauge electrical wire.

FIG. 10 illustrates a completed electrical installation in which a U-shaped bend radius adapter has been used instead of directly bending low-gauge electrical wire. A 180 degree bend radius adapter 1000 has been placed inside the junction box 960 of FIG. 9, and used to route a low-gauge electrical cable through the existing junction box 960 and conduits 970 and 972 in a manner which addresses the problem illustrated in and described with respect to FIG. 9. The bend radius adapter 1000 has a first electrical lug 1001a and a second electrical lug 1001b. A first large-diameter insulated electrical wire 1052a has been routed into junction box 960 from the first vertically-oriented conduit 970. Similarly, a second large-diameter insulated electrical wire 1052 has been routed into junction box 950 from the second vertically-oriented conduit 972.

A portion of the first large-diameter insulated electrical wire 1052a has been inserted into and secured within the first electrical lug 1001a of the bend radius adapter 1000, and a portion of the second large-diameter insulated electrical wire 1052b has been inserted into and secured within the second electrical lug 1001b of the bend radius adapter 1000. As discussed above, this insertion and securement may include the stripping of insulation from a portion of the large-diameter insulated electrical wires prior to insertion into the electrical lugs, so that compression screws can be used to secure the exposed conductive sections of the large-diameter electrical wires within the electrical lugs and place the conductive sections of the large-diameter electrical wires in electrical communication with the power transfer bar 1005 of the bend radius adapter 1000.

Thus, the first electrical lug 1001a and the second electrical lug 1001b of the 180 degree bend radius adapter 1000 are configured to allow electrical connection not only between a portion of power transfer bar 1005 adjacent the first electrical lug 1001a and the uppermost stripped portion of the first large-diameter insulated electrical wire 1052a secured in the first electrical lug 1001a, but also between a portion of power transfer bar 1005 adjacent to the second electrical lug 1001b and the uppermost stripped portion of the second large diameter electrical wire 1052b secured in the second electrical lug 1001b, electrical communication is thereby established between the first large-diameter insulated electrical wire 1052a and the second large-diameter insulated electrical wire 1052b.

Because the bend radius adapter 1000 can be formed with the desired bend in the power transfer bar 1005 and the insulating sleeve 1003 already in place, the bend radius of the bend radius adapter 1000 can safely be made smaller than would be possible by bending a low-gauge conductive wire such as the conductive wires 1052a and 1052b. Thus, this demonstrates the utility of using a 180 degree bend radius adapter to solve the problem depicted in FIG. 9 of routing a large-diameter insulated electrical wire through a junction box and/or conduit spacing that are not large enough to provide the space needed to permit a 180 degree bend in a large-diameter insulated electrical wire to be made without violating the requirements imposed by existing minimum bend radius safety standards.

Figure 11:
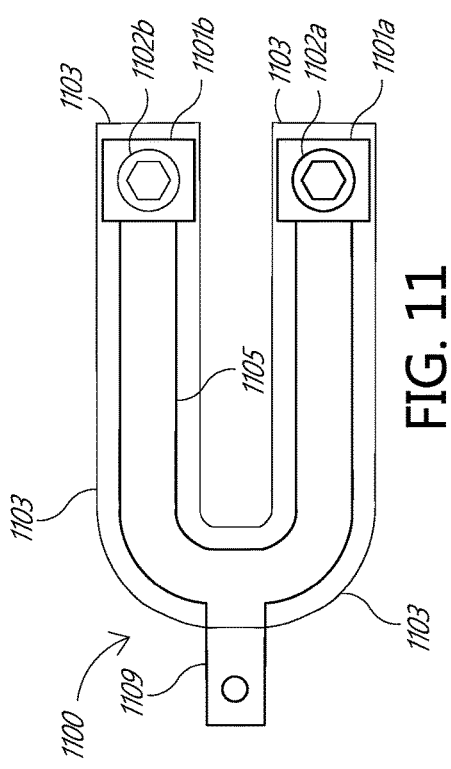
FIG. 11 is a top view of a three-way bend radius adapter.

In some embodiments, bend radius adapters have more than two connection points may be used. A three-way bend radius adapter may be used, for example, to facilitate routing and splitting of an electrical connection within a constrained space. FIG. 11 is a top view of a three-way bend radius adapter. The bend radius adapter 1100 is similar in structure to the bend radius adapter 600 of FIG. 6, in that it includes a generally-U shaped power transfer bar 1105 extending between a first end including a first electrical lug 1101a having a first compression screw 1102a and a second end including a second electrical lug 1101b having a second compression screw 1102b. An insulating sleeve 1103 covers almost all of the power transfer bar 1105, and almost all of the electrical lugs 1101a and 110b with holes allowing insertion of conductors into the lugs 1101a and 1101b and operation of the compression screws 1102a and 1102b.

However, the bend radius adapter also includes an insertion prong 1109 extending from a point on the power transfer bar 1105 located between the first and second end of the power transfer bar. In the illustrated embodiment, the insertion prong 1109 is located near the center of the bend in the power transfer bar 1105, but in other embodiments the insertion prong 1109 may extend from the power transfer bar 1105 at any point along the power transfer bar 1105. The insertion prong 1109 extends from the insulating sleeve 1109, allowing an electrical connection to be made with the insertion prong 1109 through any appropriate connection, as discussed herein.

Figure 12:
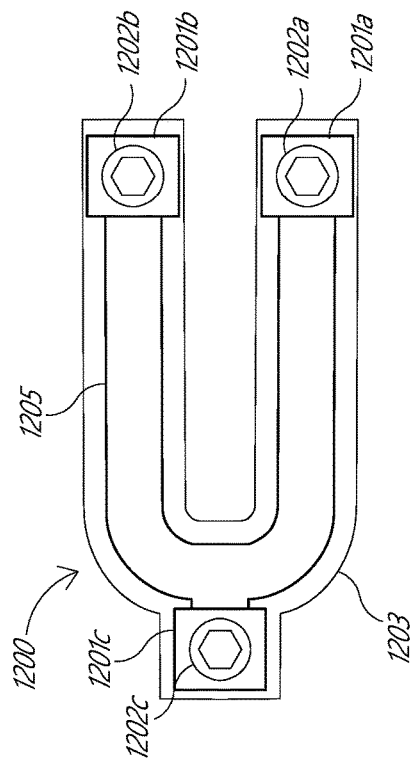
FIG. 12 is a top view of another embodiment of a three-way bend radius adapter.

FIG. 12 is a top view of another embodiment of a three-way bend radius adapter. The bend radius adapter 1200 is similar to the bend radius adapter 1100 of FIG. 11, but instead of an insertion prong extending from the power transfer bar 1205 at the midpoint of the bend radius adapter 1200, the bend radius adapter 1200 includes a third electrical lug 1201c having a compressive screw 1202c. In contrast to the exposed insertion prong of the bend radius adapter 1100 of FIG. 11, the insulating sleeve 1203 covers nearly the entire electrical lug 1201c.

Figure 13:
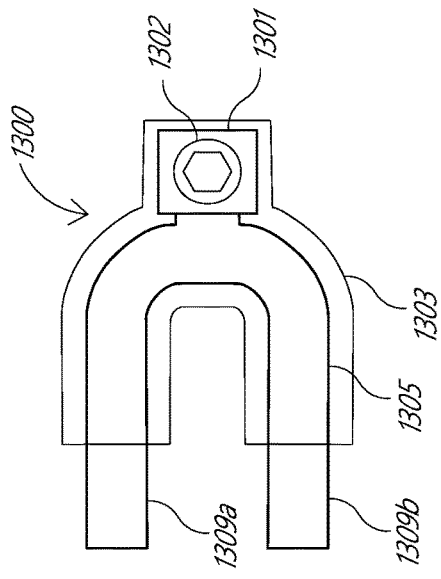
FIG. 13 is a top view of another embodiment of a three-way bend radius adapter.

FIG. 13 is a top view of another embodiment of a three-way bend radius adapter. The bend radius adapter 1300 is similar to the bend radius adapter 1100 of FIG. 11, but includes insertion prongs 1309a and 1309b at the first and second ends of the power transfer bar 1305, and an electrical lug 1301 having a compressive screw 1302 located near the midpoint of the power transfer bar 1305. In the illustrated embodiment, the insulating sleeve 1303 covers substantially the entire electrical lug 1301, as discussed above.

Any other combination of features can be utilized in forming a bend radius adapter. For example, any combination of insertion prongs, electrical lugs, and other appropriate connection structures may also be used. In some embodiments, three insertion prongs may be provided. In some embodiments, an insertion prong may be provided at a first end of a U-shaped power transfer bar, and an electrical lug may be provided at the other end of a U-shaped power transfer bar. Any suitable shape may also be used, and the spacing and length of the various sections may be adjusted as needed. In other embodiments three-way bend radius adapter need not include a U-shaped power transfer bar as shown in FIGS. 11-13, but can instead include any other configuration of a three-way power transfer bar, such as a T-shaped power transfer bar, a Y-shaped power transfer bar, or any other desired shape. In some embodiments, four or more connection structures can be in communication with a single power transfer bar, to form a four-way bend radius adapter, a five-way bend radius adapter, or any desired bend radius adapter shape.

Figure 14:
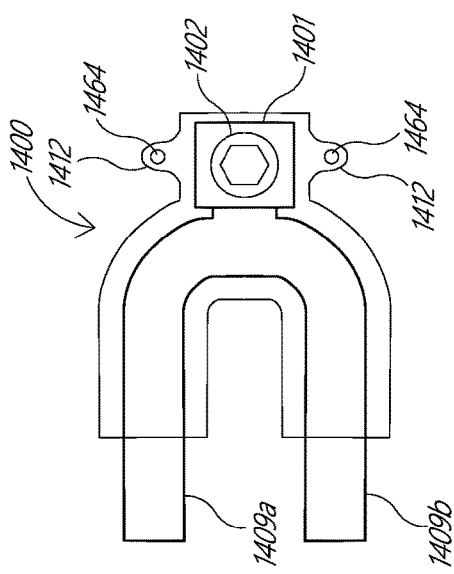
FIG. 14 is a top view of a bend radius adapter having at least one securement feature.

FIG. 14 is a top view of a bend radius adapter having at least one securement feature. The bend radius adapter 1400 is similar to the bend radius adapter 1300 of FIG. 13, but also includes a securement feature in the form of apertures 1464 extending through a securement ring or outwardly extending tabs 1412 in the insulating sleeve 1403. Screws or other fasteners can be inserted through the apertures 1464 to secure the bend radius adapter 1400 to a junction box, panel, or other structural component of an electrical system. The screws or other fasteners inserted through the apertures 1464 can be electrically isolated from the power transfer bar 1405 within the insulating sleeve 1403.

Similar securement features can be located elsewhere on a bend radius adapter, such as in the sections of the insulating sleeve adjacent insertion prongs, or at any location along the insulating sleeve, whether adjacent or between connection points. Any suitable number, position, and size of securement features may be used. Although described with respect to bend radius adapter 1400, other embodiments of bend radius adapters described herein may include such securement features, whether as an integral portion of an insulating sleeve, or as an additional component which can be slid over or otherwise secured relative to a bend radius adapter.

Figure 15:
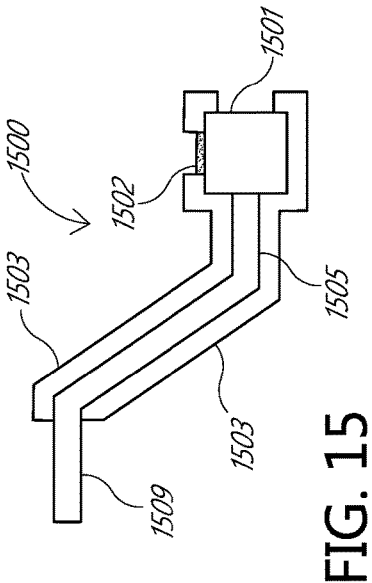
FIG. 15 is a side view of an out-of-plane bend radius adapter.

In some embodiments, the bend radius adapters may be generally planar, such that the power transfer bar and all of the connection points can lie within or substantially within a single plane. In other embodiments, however, the power transfer bar may bend in multiple dimensions, such that one or more connection points or sections of the power transfer bar are not located in a single plane. FIG. 15 is a side view of an out-of-plane bend radius adapter. The bend radius adapter includes a power transfer bar 1505 including a first planar section 1505a adjacent an electrical lug 1501 with a compression screw 1502, a second planar section 1505b terminating in an insertion prong 1509, and an intermediate section 1505c which is not coplanar with either the first planar section 1505a or the second planar section 1505b of the power transfer bar. The power transfer bar may 1505 be formed with any appropriate number of sections and angles between sections, and may include any appropriate combination of insertion prongs, electrical lugs, or other connection structures.

Figure 16:
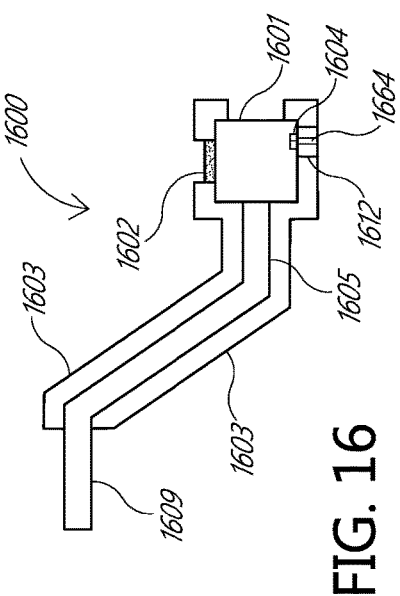
FIG. 16 is a side view of another embodiment of an out-of-plane bend radius adapter.

FIG. 16 is a side view of another embodiment of an out-of-plane bend radius adapter. The bend radius adapter 1600 is similar to the bend radius adapter 155 of FIG. 15, but also includes securement features in the form of apertures 1664 extending through tabs 1612 of the insulating sleeve 1603. Screws 1604 or other fasteners can be inserted through the apertures 1664 to secure the bend radius adapter 1600 in place. The screws 1604 are insulated from the power transfer bar 1605 within the insulating sleeve 1603.

The out-of-plane bend radius adapters can be two-way adapters, three-way adapters, or any other desired adapter structure. In some embodiments, the bend radius adapter 1500 may be a side view of the bend radius adapter of FIG. 13, with the two sides of the U-shaped prong having identical side profiles. Similarly, the bend radius adapter 1600 may be a side view of the bend radius adapter of FIG. 14.

Figure 17:
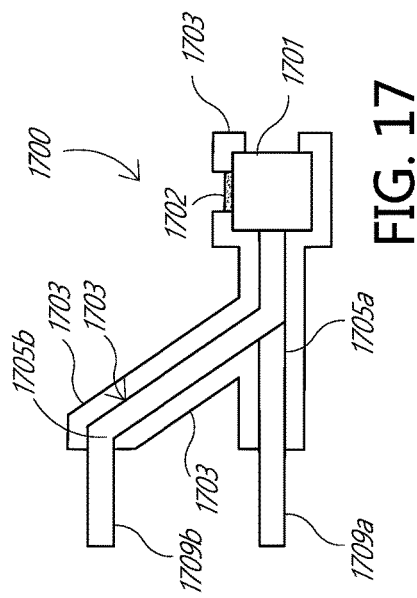
FIG. 17 is a side view of an out-of-plane bend radius adapter having at least three connection points.

FIG. 17 is a side view of an out-of-plane bend radius adapter having at least three connection points. The bend radius adapter 1700 includes a section or sections of a power transfer bar 1705a which are generally within a first plane and a section or sections 1705b which are generally within a second plane. An intermediate section connects the section or sections 1705a within the first plane and the section or sections 1705b within the second plane. A portion of the section or sections 1705a of the power transfer bar 1705 within the first plane terminates in a first insertion prong 1709a, and another portion of the section or sections 1705a of the power transfer bar within the first plane terminates in or adjacent an electrical lug 1701 having a compression screw 1702. A portion of the section or sections 1705b of the power transfer bar 1705 within the second plane terminates in a second insertion prong 1709b. As discussed above, any appropriate combination of insertion prongs, electrical lugs, or other connection points may be used.

Figure 18:
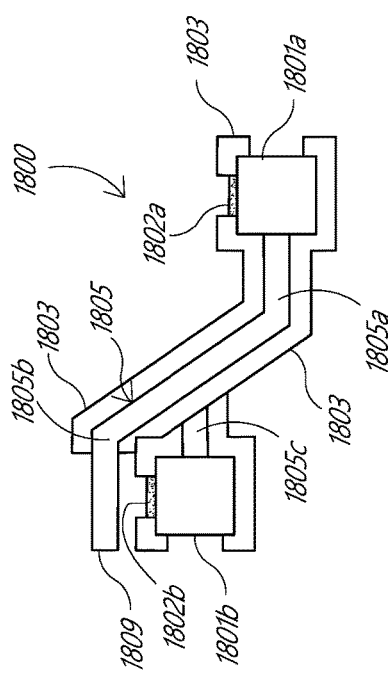
FIG. 18 is a side view of another embodiment of an out-of-plane bend radius adapter having at least three connection points.

FIG. 18 is a side view of another embodiment of an out-of-plane bend radius adapter having at least three connection points. The bend radius adapter 1800 differs from the bend radius adapter 1700 of FIG. 17 in at least two ways. First, the bend radius adapter includes two electrical lugs 1801a and 1801b and a single insertion prong 1809. In addition, a portion of the section or sections 1805a of the power transfer bar 1805 adjacent the first electrical lug 1801a are located within a first plane, a portion of the section or sections 1805b of the power transfer bar 1805 terminating in the insertion prong 1809 are located within a second plane, and a portion of the section or sections 1805c of the power transfer bar 1805 adjacent the second electrical lug 1801b are located within a third plane, such that each of the at least three connection points are located at different heights. In addition, the power transfer bar may include any combination of intermediate sections connecting the planar sections. For example, in some embodiments a single intermediate section may extend from the lowest section or sections 1805a to the highest section or sections 1805, with the middle section or sections 1805b branching off of that single intermediate section. In other embodiments, separate intermediate sections may connect the various sections of the power transfer bar 1805 at different heights. Any appropriate combination of insertion prongs, electrical lugs, or other connection points may also be used.

FIG. 19 is a top view of a bend radius adapter with integral securement features. The bend radius adapter 1900 includes a power transfer bar which terminates in an insertion prong 1909 at one end, and adjacent an electrical lug 1901 including a connection screw 1902 at a second end. The power transfer bar includes elongated apertures 1918 extending therethrough, with the interior surfaces of the elongate apertures being covered by insulating material such as the insulating material of the insulating sleeve 1903. The elongated apertures 1918 or slots can serve as securement features and can receive one or more screws for positioning and securing the bend radius adapter 1900 relative to another component of an electrical system. Because the interior surfaces of the elongated apertures 1918 are coated with an insulating material, the screws or other fasteners inserted through the elongated apertures 1918 are insulated from the power transfer bar 1905. By inserting the screws through an insulated aperture 1918 extending through the power transfer bar 1905 itself, the rigidity and strength of the power transfer bar 1905 can be utilized to form a particularly robust and secure connection to another component of an electrical system.

FIG. 20 is a top view of another embodiment of a bend radius adapter with integral securement features. The bend radius adapter 2000 in the illustrated embodiment includes a power transfer bar 2005 which extends between a first electrical lug 2001a and a second electrical lug 2001b. The power transfer bar 2005 also includes insulated apertures 2019 extending therethrough. Unlike the elongated apertures 1918 of the bend radius adapter of FIG. 19, the insulated apertures 2019 are generally round. The insulated apertures can receive a hold-down screw, such as a self-tapping hold-down screw, or other fastener, to secure the bend radius adapter 2000 to an electrical system component such as a breaker or a junction box.

Securement devices in the form of insulated apertures in a power transfer bar can be used in conjunction with any of the bend radius adapters described herein, and can in some embodiments be used in conjunction with other securement devices, such as apertures extending through tabs or other sections of an insulating sleeve surrounding a power transfer bar. In other embodiments, an insulated screw or other fastener can be used instead of an insulated aperture lining, or a separate insulating sleeve can be used in conjunction with a non-insulated aperture.

Figure 21:
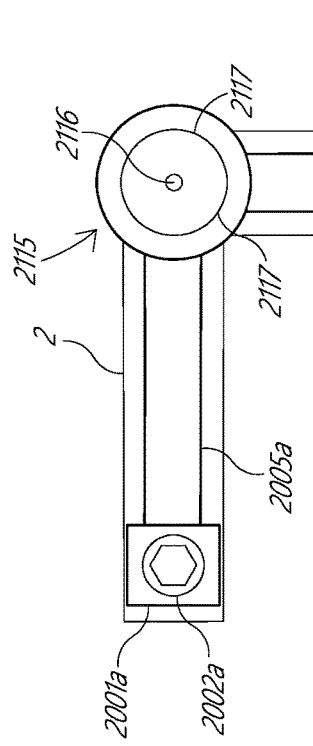
FIG. 21 is a top view of an adjustable bend radius adapter with a single articulation point.

In some embodiments, a bend radius adapter may be designed so that the angle of bend in a bend radius adapter may be adjustable, rather than fixed. FIG. 21 is a top view of an adjustable bend radius adapter with a single articulation point. The bend radius adapter 2100 includes a first power transfer bar 2105a which extends between a first electrical lug 2101a and an adjustable bend joint 2115. The bend radius adapter 2100 also includes a second power transfer bar 2105b which extends between a second electrical lug 2101b and the adjustable bend joint 2115. As discussed in greater detail herein, the adjustable bend joint includes two facing rotatable discs 2017 which can be rotated about a central adjustment screw 2016. The adjustment screw 2016 may be used to hold the facing discs 2017 in place relative to one another. In some embodiments, the facing surfaces of rotatable discs 2017 may be radially toothed to constrain the rotational position of the discs relative to one another to one of a limited number of positions. In other embodiments, the facing surfaces of the discs may be freely rotatable and may be held in place relative to one another by a frictional fit.

In some embodiments, facing or adjacent surfaces of the first and second power transfer bars 2105a and 2105b can be used to form an electrical connection between the first and second power transfer bars 2105a and 2105b. In other embodiments, any suitable configuration of intermediate conductive structures may be used to form the electrical connection. In some embodiments, one or both of the facing surfaces of the rotatable discs or the angular adjustment screw may form a part of a conductive path between the first and second power transfer bars 2105a and 2105b.

In the illustrated embodiment, the adjustable bend radius adapter 2100 is shown in a position in which the power transfer bars 2105a and 2105b are at a roughly 90 degree angle relative to one another, but the adjustable bend radius adapter 2100 can be moved to any other appropriate angle.

Figure 22D:
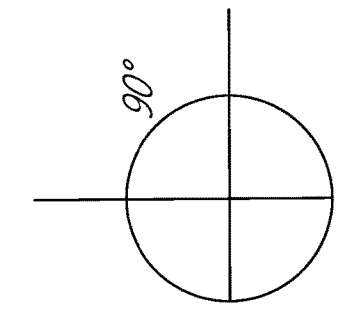
FIGS. 22A-22D schematically illustrate tooth arrangements for facing surfaces of rotatable discs in an adjustable bend joint such as the adjustable bend joint of FIG. 21.
Figure 22C:
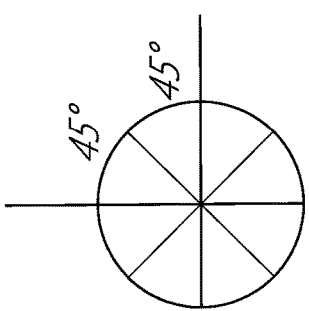
Figure 22B:
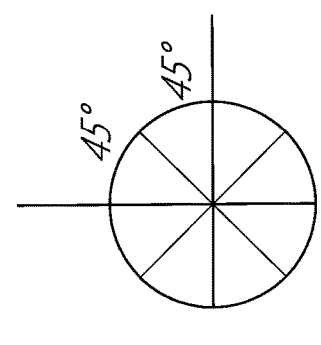
Figure 22A:
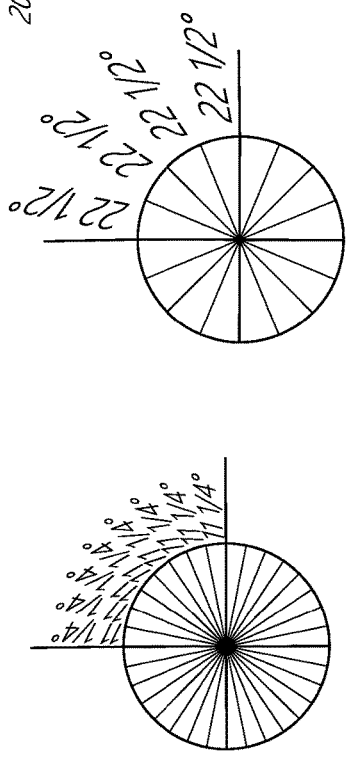

FIGS. 22A-22D schematically illustrate tooth arrangements for facing surfaces of rotatable discs in an adjustable bend joint such as adjustable bend joint 2015 of FIG. 21. FIG. 22A shows a disc pattern with 32 discrete, equally-spaced raised teeth, providing up to 32 discrete angular arrangements between matching facing discs. FIG. 22B shows a disc pattern with 16 discrete, equally-spaced raised teeth, FIG. 22C shows a disc pattern with 8 discrete, equally-spaced raised teeth, and FIG. 22D shows a disc pattern with 4 discrete, equally-spaced raised teeth, each providing up to the corresponding number of discrete angular arrangements between matching facing discs. Depending on the arrangement of the particular adjustable bend radius adapters, positions in which the power transfer bars on either side of an adjustable bend joint are parallel to one another or close to parallel to one another may not be practical in all embodiments. For example, in embodiments which include at least one electrical lug, the thickness of at least one electrical lug may interfere with the ability of the power transfer bars to be positioned in an overlying and parallel position.

FIG. 23A is a top view of another embodiment of an adjustable bend radius adapter having multiple articulation points. FIG. 23B is a schematic cross-sectional view which schematically illustrates the adjustable bend radius adapter of FIG. 23A. The bend radius adapter 2300 includes a first power transfer bar 2305a which extends between a first electrical lug 2301a and a first adjustable bend joint 2315a. The bend radius adapter 2300 also includes a second power transfer bar 2305b which extends between a second electrical lug 2301b and a second adjustable bend joint 2315b. A third power transfer bar 2305c extends between the first adjustable bend joint 2315a and the second adjustable bend joint 2315b. By providing two adjustable bend joints 2315a and 2315b, the bend radius adapter 2300 includes multiple points of articulation, giving greater flexibility in the possible shapes formed by the bend radius adapter.

In FIG. 23B, it can be seen that the facing discs 2017 are integral extensions of the power transfer bar sections 2305a, 2305b, and 2305c at the ends of those sections. However, any other suitable arrangement may also be used, as discussed above. The facing surfaces are schematically illustrated with a jagged line to more clearly reflect the interacting radial teeth, although a given cross-section passing through the screw 2316 may not include such a pattern. The insulating sleeve 2303 surrounds each section of the bend radius adapter, with the exception of the exposed sections which allow electrical connection at the lugs 2301a and 2301b and at the exposed conductive faces of the disc sections 2317 of the power transfer bar sections 2305a, 2305b, and 2305c. Lug attachment screws 2365 or other appropriate fasteners or securement devices are used to mechanically secure the electrical lugs 2301a and 2301b to the underlying power transfer bars 2305a and 2305b to ensure electrical connections with the power transfer bars 2305a and 2305b.

Figures 24A, 24B:
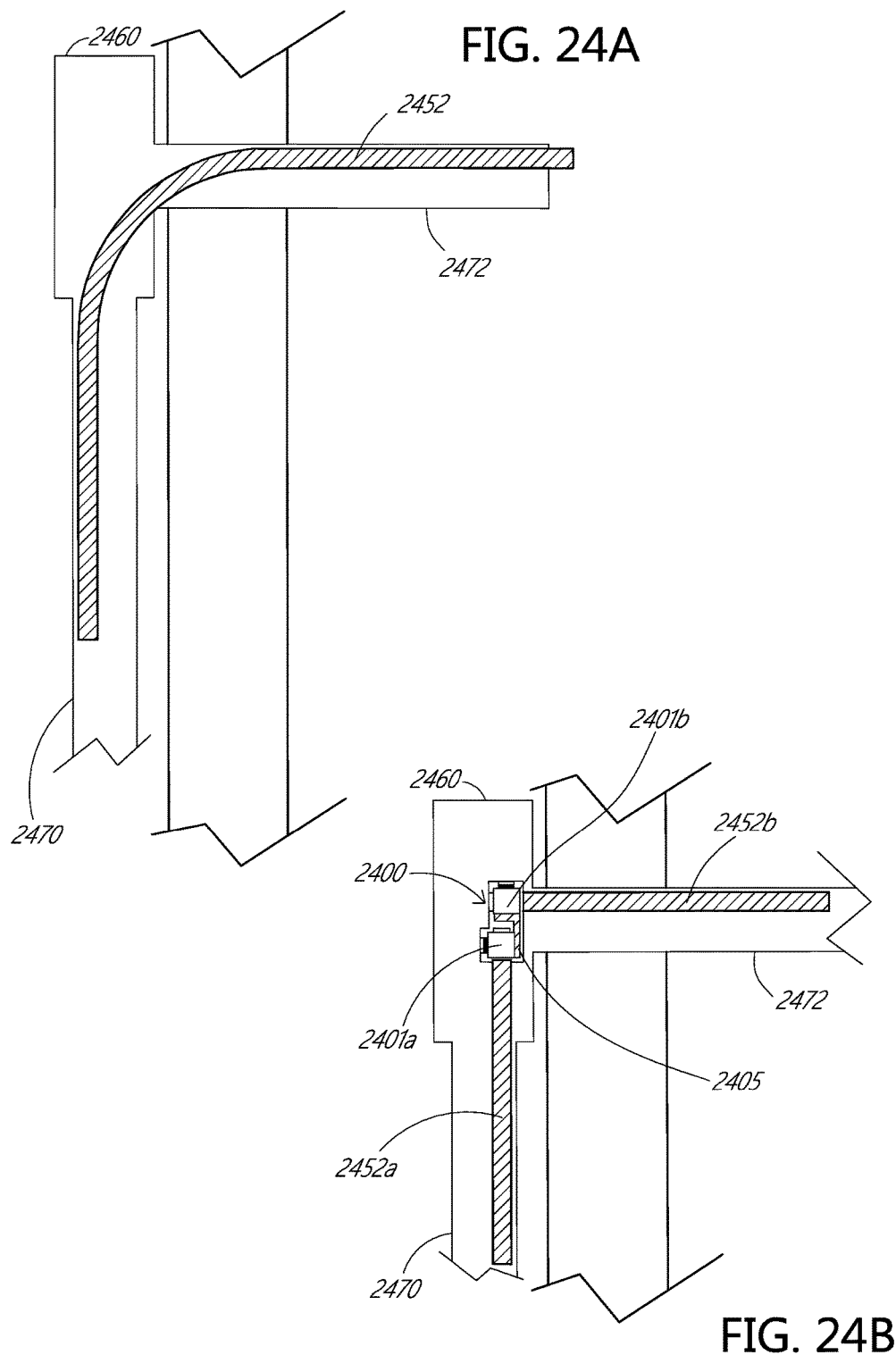
FIG. 24A is a side cross-sectional view of an attempt to route a low-gauge electrical cable through a junction box at the intersection of two electrical conduits.
FIG. 24B is a side cross-sectional view of an arrangement in which a bend radius adapter having two orthogonally oriented electrical lugs is used to route a low-gauge electrical cable through the junction box of FIG. 24A.

FIG. 24A is a side cross-sectional view of an attempt to route a low-gauge electrical cable through a junction box at the intersection of two electrical conduits. An electrical cable 2452 passes through a vertically-oriented conduit 2470 and into a junction box 2460, and out through a horizontally-oriented conduit 2472. Due to restrictions on the bend radius of the low-gauge electrical cable 2452, whether physical or regulatory, the low-gauge electrical cable cannot be routed through the junction box 2460, due to the required curvature of the low-gauge cable 2542.

FIG. 24B is a side cross-sectional view of an arrangement in which a bend radius adapter having two orthogonally oriented electrical lugs is used to route a low-gauge electrical cable through the junction box of FIG. 24A. The bend radius adapter 2400 includes a first vertically-oriented electrical lug 2401a configured to receive a vertically-oriented section of low-gauge electrical cable 2452a, which extends into the junction box 2460 from the vertically-oriented conduit 2470. The bend radius adapter 2400 also includes a second, horizontally-oriented electrical lug 2401b configured to receive a horizontally-extending section of low-gauge electrical cable 2452b which extends into the junction box 2460 from the horizontally-oriented electrical conduit 2472.

Because of the difference in orientation between the vertically-oriented electrical lug 2401a and the horizontally-oriented electrical lug 2401b, a connection can be made in a very constrained space between two orthogonally-oriented sections of low-gauge cable without the need for a large amount of space to safely bend the cable. The power transfer bar 2405 within the bend radius adapter is shaped to form a connection between the two electrical lugs 2401a and 2401b.

FIG. 25A is a detailed front view of a bend radius adapter having orthogonally-oriented lugs, such as the bend radius adapter of FIG. 24B. FIG. 25B is a side view of the bend radius adapter such as the bend radius adapter of FIG. 25A. The bend radius adapter 2500 includes a first electrical lug 2501a configured to receive a section of an axially-extending cable 2514a in the direction of the longest dimension of the bend radius adapter 2500, also referred to as the long axis of the bend radius adapter. The bend radius adapter also includes a second electrical lug 2501b configured to receive a section of a cable 2514b extending in a direction perpendicular to the long axis of the bend radius adapter 2500.

The power transfer bar 2505 is shaped and dimensioned to place cable 2514a within the first electrical lug 2501a in electrical connection with cable 2514b within the second electrical lug 2501b. In some embodiments, the power transfer bar 2505 may also provide rigidity to the power transfer bar 2505. In some embodiments, the power transfer bar may include at least a first generally planar section configured to contact a side of the electrical lug 2501a opposite the compression screw 2502a, and a second generally planar section, orthogonal to the first generally planar section, and configured to contact a side of the electrical lug 2501b opposite the compression screw 2502b. In some embodiments, any suitable combination of lug orientations may be used, including any combination of orthogonal orientations, and any combination of non-orthogonal orientations.

In some particular embodiments, a structure similar to the bend radius adapters described herein can be used as a connector between two axially aligned sections of cable. FIG. 26 is a detailed side view of an adapter including two axially-aligned electrical lugs. The adapter 2600 includes a first electrical lug 2601a configured to receive a section of a first cable 2614a extending in a direction parallel to a long axis of the adapter 2600, and a second electrical lug 2601b configured to receive a section of a first cable 2614b extending in a direction parallel to the long axis of the adapter 2600. The power transfer bar 2605 in the adapter 2600 may in some embodiments be a generally planar structure which is configured to contact the sides of the electrical lugs 2601*a* and 2601*b* opposite compression screws 2602*a* and 2602*b*, respectively. Such an adapter 2600 can be used to connect two lengths of cable 2614*a* and 2614*b*, and the adapter 2600 can include securement features (not shown) to allow securement of the adapter 2600 to an electrical system component.

In some embodiments, bend radius adapters can be used to make a lug-to-prong connection, allowing for example the use of a connection between wiring nearing a breaker even when the wiring extends in a different direction than the insertion prong configured to be inserted into the lug of a breaker. FIG. 27A is a side view of a bend radius adapter including an electrical lug on a first side and an insertion prong on a second side. FIG. 27B is a detailed view of the compression screw of the bend radius adapter of FIG. 27A. The bend radius adapter 2700 includes an electrical lug 2701 having a compression screw 2702, and an angled power transfer bar 2705 that terminates in an insertion prong. In the illustrated embodiment, the power transfer bar 2705 extends initially parallel to the base of the electrical lug 2701, undergoes a first right angle bend, and then undergoes a second bend which controls the angle at which the insertion prong is canted relative to the base of the electrical lug 2701. In the illustrated implementation, the insertion prong is canted upwards and away from the lug 2701, but in other embodiments insertion prongs may be oriented at different angles relative to the lug 2701. In this embodiment, the insertion prong is vertically offset from the lug 2701, as well as being oriented in a direction at least partially perpendicular to the axis along which a cable can be inserted into the lug 2701. Other embodiments may utilize different arrangements. For example, the lug 2701 can be oriented in a different position, such that the base of the 2701 is aligned with the vertically extending portion of the power transfer bar 2705, such that the horizontally extending section in the bend radius adapter 2700 is not required, making a more compact lug-to-prong adapter.

In the detailed cross-sectional view of FIG. 27B, it can be seen that the compression screw in the illustrated embodiment is a set screw 2733, which can be any appropriate type of screw, including but not limited to an Allen hex, metric hex, Phillips head, slotted head, Bristol 6-flute multi-spline, Reed and Prince, square head, TORX, or Gunsmith specialty slotted screw. Such screw types can be used for any of the electrical lug compression screws discussed herein, as well as for bend radius adapter fastening screws, breaker wire fastening screws, bend radius adapter angle adjustment screws, adjustment screws to hold down a bend radius adapter, hold down screws for a bend radius adapter, and assemble screws to hold a spring-steel bend radius adapter together, as well as any other suitable use.

The set screw 2733 also includes an O-ring seal 2732 extending around the perimeter of the set screw 2733. The use of such an O-ring seal 2732 can be used to make any of the various embodiments described herein watertight or waterproof, so long as the other possible sources of water permeation have been addressed. The O-ring seal can include a variety of different materials, including but not limited to polypropylene or similar materials.

FIG. 28 is a side cross-section of a bend radius adapter similar to the bend radius adapter of FIG. 27A, illustrating the electrical connection between an inserted cable and the power transfer bar. The bend radius adapter 2800 is similar to the bend radius adapter 2700 of FIG. 27A, except that the insertion prong 2809 is canted at a slightly different angle. FIG. 28 also illustrates the cross-section of conductive strands of an electrical cable 2852 inserted into electrical lug 2801. The compression screw compresses those conductive strands of electrical cable 2852 against an underlying section of the power transfer bar 2805, shown in dashed lines, forming an electrical connection between the electrical cable 2852 and the power transfer bar 2805, and ultimately between the electrical cable 2852 and the insertion prong 2809.

Figure 29A:
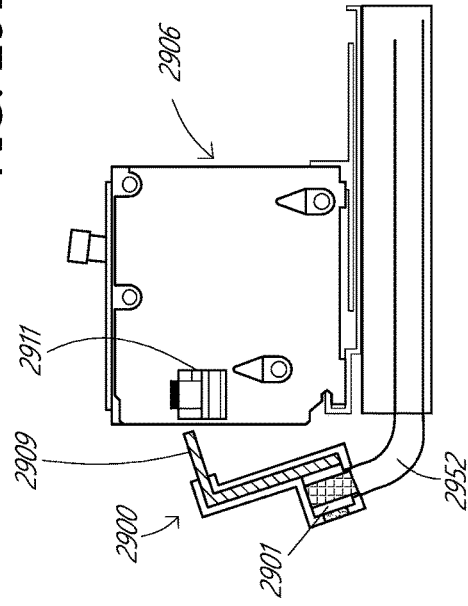
FIGS. 29A-29C illustrate various steps in the use of a bent radius adapter to form a redirecting connection between low-gauge wiring and a circuit breaker.
Figure 29B:
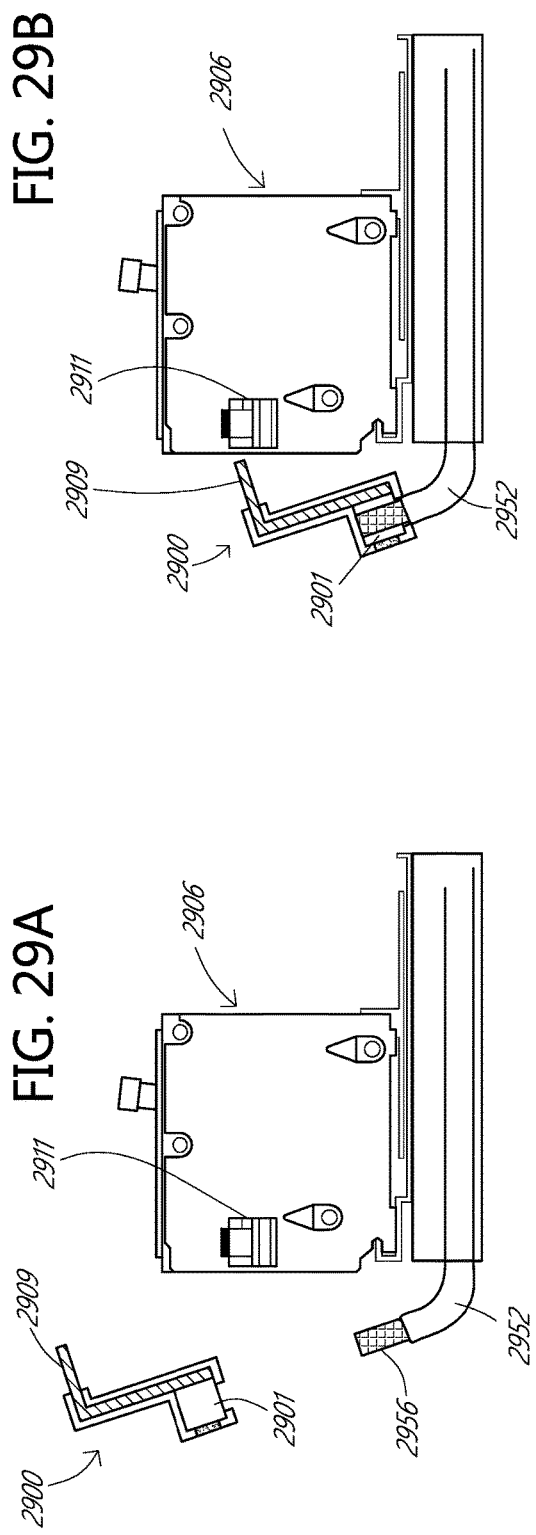
Figure 29C:
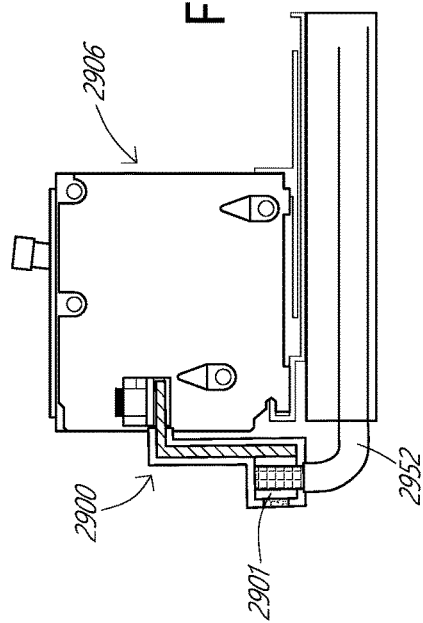

FIGS. 29A-29C illustrate various steps in the use of a bent radius adapter to form a redirecting connection between low-gauge wiring and a circuit breaker. The circuit breaker 2906 includes a circuit breaker lug 2911 configured to receive a conductive structure extending in a first direction, towards the right of the figure. The electrical wire 2952 to be connected to the circuit breaker 2906 extends initially in the opposite direction of the receiving direction of the circuit breaker lug 2911. Rather than forming a 180-degree bend in the electrical wire 2952, a bend radius adapter 2900 is used to form part of the connection between the electrical wire 2952 and the circuit breaker 2906.

The bend radius adapter 2900 includes an electrical lug 2901 configured to receive wiring extending in a first direction, and an insertion prong extending in a second direction, perpendicular to the first direction. In FIG. 29A it can be seen that the end of the electrical wire 2952 has been stripped of insulation to form an exposed conductive portion 2956, in preparation for insertion into the electrical lug 2901 of the bend radius adapter. In FIG. 29B it can be seen that the exposed conductive portion 2956 of the electrical wire 2952 has been inserted into the electrical lug 2901 of the bend radius adapter 2900. Finally, in FIG. 29C, the insertion prong 2909 of the bend radius adapter 2900 has been inserted into the circuit breaker lug 2911, forming an electrical connection between the electrical wire 2952 and the circuit breaker 2906.

In the illustrated embodiment, the wiring 2952 undergoes only a 90-degree bend, rather than a 180-degree bend. In alternative embodiments, a bend radius adapter could be used in which the insertion direction of the electrical lug of the bend radius adapter is generally aligned with the initial direction of the electrical wire 2952, to further reduce the amount of bending required to form a connection with the overlying circuit breaker 2906.

FIGS. 30A-30C illustrate side views of various embodiments of circuit breakers having bend radius adapters installed. FIG. 30A shows an example of a circuit breaker 6 having an insertion prong 9 of a bend radius adapter 100 installed in the circuit breaker lug 11. In the embodiment of FIG. 30A the circuit breaker 6 is installed on a bus assembly 8 over a stamped-out portion 47 of an electrical panel or circuit breaker box. The stamped-out portion 47 of the electrical panel can be used, for example, to accommodate main power cables or other electrical wires (not shown), which can be inserted into the electrical lug 1 of the bend radius adapter 100. The height of the bend radius adapter, including the vertically-oriented portion of the power transfer bar 5, is dimensioned to accommodate the additional height of the stamped portion 47. Fasteners 4 can be used to secure the bend radius adapter 100 in place within the electrical panel or circuit breaker box.

FIG. 30B illustrates another embodiment of a circuit breaker having a bend radius adapter installed. The circuit breaker 6 of FIG. 30B is installed on a bus assembly 8, the base of which is generally coplanar with the base of the bend radius adapter 100. The height of the bend radius adapter 100 is dimensioned to accommodate the reduced distance between the electrical lug 1 and the insertion prong 9.

FIG. 30C illustrates another embodiment of a circuit breaker having a bend radius adapter installed. The circuit breaker 6 is installed on a stamped-out portion of the panel, but the bend radius adapter 100 is secured to an underlying spacer 13, which may be formed by an insulating material, in order to accommodate the height difference between the bend radius adapter 100 and the circuit breaker 6.

FIG. 31A is a front view of a bend radius adapter having two electrical lugs 1, each of which have a section of a main power cable 14 installed therein. FIG. 31B is a top view of the bend radius adapter of FIG. 31A, without the power cables installed in the lugs. It can be seen in FIG. 31A that the electrical lug 1 can be mechanically connected to the power transfer bar 5 via a lug attachment screw 15, ensuring an electrical connection between the lug 1 and the power transfer bar 5. In the illustrated embodiment, the lugs 1 are horizontally displaced from one another, but in the same vertical plane. The insulating material 3 surrounding the bend radius adapter is dimensioned and shaped to route one of the power cables 14 past one electrical lug 1 and to the other electrical lug 1. It can be seen in FIG. 31B that the insertion prongs extend outward from the insulating sleeve 3, in a direction substantially perpendicular to the direction in which the power cables 14 are inserted into the electrical lugs 1.

FIGS. 32A-32C illustrate side views of various embodiments of circuit breakers having bend radius adapters installed. In FIG. 32A, the bend radius adapter 100 includes two electrical lugs 1, which may be side by side, or offset from one another in the direction of the page. The electrical lugs 1 are in electrical communication with the insertion prongs 9 installed in the circuit breaker lugs 11 of the circuit breaker 6. The two separate power transfer bars 5 connecting the lugs 1 to a corresponding insertion prong 9 are encapsulated, along with other components of the bend radius adapter other than the prong 9, in an insulating material 3, either separately or together. As described above with respect to FIG. 30A, the circuit breaker 6 is in the embodiment of FIG. 32A installed on a stamped out portion 47, and the height of the bend radius adapter 100 is dimensioned accordingly.

FIG. 32B illustrates another embodiment of a circuit breaker having a bend radius adapter installed. The circuit breaker 6 of FIG. 32B, like the circuit breaker of FIG. 30B, is installed on a bus assembly 8, the base of which is generally coplanar with the base of the bend radius adapter 100. The height of the bend radius adapter 100 is dimensioned to accommodate the reduced distance between the electrical lug 1 and the insertion prong 9.

FIG. 32C illustrates another embodiment of a circuit breaker having a bend radius adapter installed. Like the bend radius adapter of FIG. 30C, the bend radius adapter of FIG. 32C is installed on an insulating spacer material to accommodate for the height differential resulting from the installation of the circuit breaker 6 on stamped-out portion 47.

FIG. 33A is a top plan view of an embodiment of a pair of bend radius adapters. The bend radius adapters of FIG. 33A are encapsulated in an insulating material, with the exception of the insertion prongs 9. FIG. 33B is a top plan view of an alternative embodiment of a pair of bend radius adapters, in which the bend radius adapters include securement rings 12 configured to receive fasteners 4 to secure the bend radius adapters in place.

FIG. 34 is a side view of an embodiment of a circuit breaker having bend radius adapters installed. FIG. 35 is a front view of a circuit breaker and bend radius adapters similar to those of FIG. 34. The bend radius adapter 100 includes a pair of vertically offset, but horizontally aligned, electrical lugs 2, each of which is electrically connected to a power transfer bar 5 terminating in an insertion prong 9. In some embodiments, the two sets of lugs 1, power transfer bars 5, and insertion prongs 9 are separately encapsulated with the insertion prongs 9 left unencapsulated, while in other embodiments the two sets of lugs 1, power transfer bars 5, and insertion prongs 9 are encapsulated in a single structure with the insertion prongs left unencapsulated. In the illustrated embodiment, the breaker 6 is installed on a bus assembly 8 over a stamped-out portion 47 of an electrical panel or circuit breaker box, and the power transfer bars 5 are dimensioned accordingly, but other configurations are possible, as discussed with respect to other embodiments.

FIG. 36A is a top plan view of a bend radius adapter including a pair of electrical lugs 1 and a pair of insertion prongs 9. The bend radius adapter can be secured in place via fasteners 4 extending through insertion rings 12. FIG. 36B is a top plan view of a bend radius adapter similar to that of FIG. 36A, without the insertion rings 12.

FIG. 37A is a top plan view of a pair of bend radius adapters, each including an electrical lug and an insertion prong. The bend radius adapters can be secured in place via fasteners 4 extending through insertion rings 12. FIG. 37B is a top plan view of a pair of bend radius adapters similar to that of FIG. 37A, without the insertion rings 12.

FIG. 38A is a side view of a bend radius adapter including pair of electrical lugs and a pair of power transfer bars which terminate in insertion prongs. FIG. 38B is a cross-sectional side view of a bend radius adapter similar to the bend radius adapter of FIG. 38A. It can be seen in FIG. 38B that a lug attachment screw 15 mechanically connects at least one of the lugs 1 to the underlying power transfer bar 5, ensuring an electrical connection between the lug 1 and the underlying power transfer bar 5.

Figure 39B:
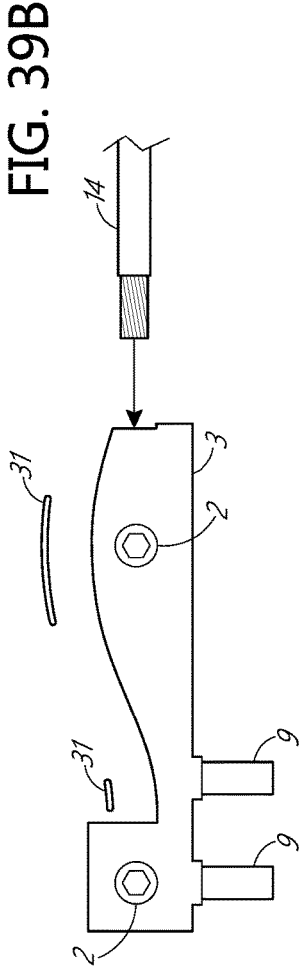
Figure 39D:
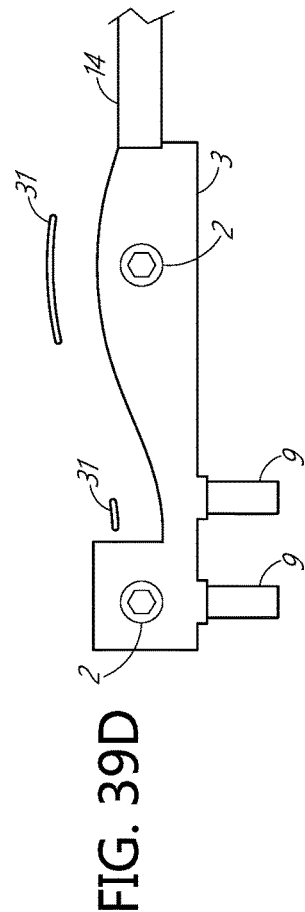
Figure 39F:
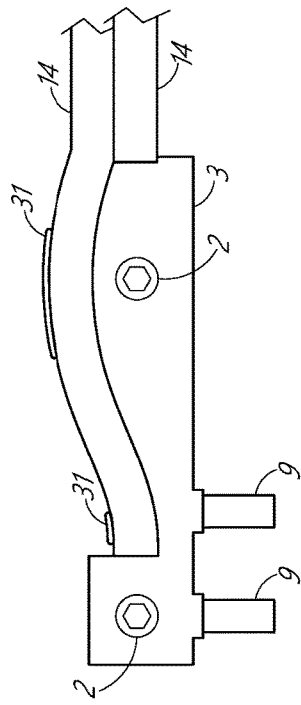

FIGS. 39A-39F illustrate various views during a process of installing main power cables in the electrical lugs of a bend radius adapter similar to the bend radius adapters of FIGS. 38A and 38B. FIGS. 39A and 39B are top and side views, respectively, of a stage in which a first cable 14 is being inserted into a rightmost lug 1 (see FIGS. 38A and 38B). FIGS. 39C and 39D are top and side views, respectively, of a stage in which the first cable 14 has been inserted into a rightmost lug 1. FIGS. 39E and 39F are top and side views, respectively of a stage in which a second cable 14 has been inserted into the leftmost lug 1, guided by the curved edge of the insulating material 3 and cable retaining structures 31 spaced apart from the curved edge of the insulating material.

FIGS. 40A-40C are front views of various stages in a process of installing main power cables in the electrical lugs of a bend radius adapter similar to the bend radius adapter of FIG. 35B. In FIG. 40A, it can be seen that a first cable 4014a is being inserted into a first electrical lug 4001a of bend radius adapter 4000. The bend radius adapter 4000 may in some embodiments be a single structure including both a first lug 4001a in electrical communication with a first insertion prong installed in breaker 4006, and a second lug 4001b in electrical communication with a second insertion prong installed in breaker 4006. In other embodiments, the bend radius adapter 4000 may include two separate structures.

In FIG. 40B, it can be seen that the first cable 4014a has been installed into the first electrical lug 4001a of the bend radius adapter 4000, and a second cable 4014b is being installed into a second electrical lug 4001b of bend radius adapter 4000. The vertical offset of the first and second electrical lugs 4001a and 4001b allow the second cable 4014b to pass by the first electrical lug 4001a, even if the first and second electrical lugs 4001a and 4001b are not offset from one another in or out of the page. In FIG. 40C it can be seen that the second cable 4014b has been installed into the second electrical lug 4001b, placing both the cables 4014a and 4014b in electrical communication with circuit breaker 4006 via the bend radius adapter 4000.

Figure 41B:
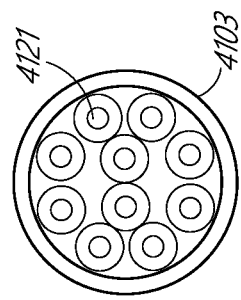
FIG. 41B is a cross-sectional view of the flexible bend radius adapter of FIG. 41A, taken along the line B-B.
Figure 41A:
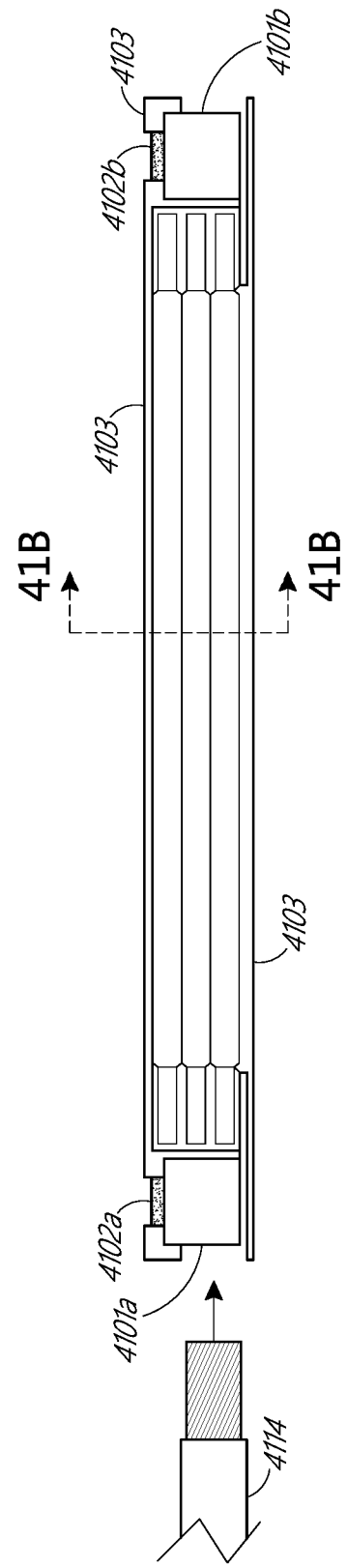
FIG. 41A is a side cross-sectional view of an embodiment of a flexible bend radius adapter.

In some embodiments, at least a portion of the power transfer path connecting two connection points in a bend radius adapter can be formed from a flexible material. FIG. 41A is a side cross-sectional view of an embodiment of a flexible bend radius adapter, and FIG. 41B is a cross-sectional view of the flexible bend radius adapter of FIG. 41A, taken along the line B-B.

The bend radius adapter 4100 of FIG. 41A includes a flexible power transfer path extending between a first electrical lug 4101a and a second conductive lug 4101b. A rigid power transfer bar portion 4105a is adjacent the first electrical lug 4101a, and a rigid power transfer bar portion 4105b is adjacent the second electrical lug 4101b. Extending between the rigid power transfer bar portions 4105a and 4105b are a plurality of small-diameter metallic wires 4121 within insulating sleeve 4103. The small-diameter metallic wires 4121 may in some embodiments range in thickness between a hundredth of a millimeter to several tenths of a millimeter in diameter, although diameters higher and lower than that range may also be used. The inclusion of a section of the power transfer path between the first electrical lug 4101a and a second conductive lug 4101b renders the section of the flexible bend radius adapter highly flexible, with the degree of flexibility depending at least in part on the diameter, number, and composition of the individual metallic wires 4121.

FIG. 42A is a side view of another embodiment of a flexible bend radius adapter, and FIG. 42B is a cross-sectional view of the flexible bend radius adapter of FIG. 42A, taken along the line B-B.

The bend radius adapter 4200 of FIG. 42A includes a flexible power transfer path extending between a first electrical lug 4201a and a second conductive lug 4201b. Extending between the at some point along the power transfer path between the first electrical lug 4201a and the second conductive lug 4201b are a plurality of micro-diameter metallic wires 4220 within insulating sleeve 4203. The micro-diameter metallic wires 4220 may in some embodiments range in thickness between a few microns to a hundredth of a millimeter in diameter, although diameters higher and lower than that range may also be used. The use of micro-diameter metallic wires 4220 may render the flexible bend radius adapter even more flexible than the bend radius adapter 4100.

FIG. 43A is a side cross-sectional view of another embodiment of a flexible bend radius adapter, and FIG. 43B is a cross-sectional view of the flexible bend radius adapter of FIG. 43A, taken along the line B-B. The bend radius adapter 4300 differs from the bend radius adapter 4200 in the orientation of electrical lugs 4301a and 4301b.

FIG. 44A is a front cross-sectional view of another embodiment of a flexible bend radius adapter, FIG. 44B is a side-cross-sectional view of the flexible bend radius adapter of FIG. 44A, and FIG. 44C is a cross-sectional view of the flexible bend radius adapter of FIG. 44A, taken along the line C-C. FIG. 44D is a side view of the flexible bend radius adapter of FIG. 44A in a first bent position, and FIG. 44E is a side view of the flexible bend radius adapter of FIG. 44A in a second bent position. Because the bend radius adapter 4000 is substantially thinner in one dimension than the other dimension, including only a single row of small-diameter metallic wires 4420, the bend radius adapter 4000 is substantially more flexible in the thinner direction than in the thicker direction, as can be seen in the flexibility demonstrated in FIGS. 44D and 44E.

FIG. 45A is a cross-sectional view of another embodiment of a flexible bend radius adapter. FIG. 45B is a detailed cross-sectional view of one of the bend radius adapter sub-assemblies disposed throughout the flexible bend radius adapter of FIG. 45A. FIG. 45C is a side view of the flexible bend radius adapter of FIG. 45A in a first bent position, and FIG. 45D is a side view of the flexible bend radius adapter of FIG. 45A in a second bent position. The flexible bend radius adapter 4500 includes a plurality of flexible metal strips 27 such as spring steel metal strips which pass between the contactors 28 in each of the bend radius adapter sub-assemblies 26 disposed along the length of the bend radius adapter 4500. The bend radius adapter sub-assemblies 26 are held in place by assembly screws 25 or any other suitable fastener or securement structure. The ends of the flexible metal strips 27 include slide stops 29 which prevent the ends of the flexible metal strips from passing through the closest bend radius adapter sub-assembly 26.

As can be seen in FIGS. 45C and 45D, the ability of the flexible metal strips 27 to slide within the contactors 28 allows the flexible bend radius adapter 4500 to adapt to flexure of the assembly, with the flexible metal strips 27 on the outer edge of the curvature having the slide stops 29 brought closer to the closest bend radius adapter sub-assemblies 26. The conductive contactors 28 in combination with the flexible metal strips 27 thus form part of a flexible power transfer path which permits bending in a wide range of directions and degrees. Insulating material can be disposed between the metal strips 27 in some embodiments.

FIG. 46 is a side cross-sectional view of a waterproof collar that can be tightened to make a portion of a bend radius adapter waterproof. As the narrowing threaded collar is screwed onto the interior threaded section, the connection tightens in region 4636, which can render any bend radius adapter waterproof with proper installation of the collar.

FIG. 47A is a side cross-section of an embodiment of a flexible bend radius adapter which includes liquid or powdered conducting material. FIG. 47B is an axial view of the flexible bend radius adapter of FIG. 47A. FIG. 47C depicts the flexible bend radius adapter of FIG. 47A in a bent position. The flexible bend radius adapter 4700 extends between a first lug 4701a and a second lug 4701b, or any combination of appropriate connection point structures. A hollow tube 4735, which may be made from a plastic, rubber, polypropylene or any other suitable material that is flexible and waterproof, defines an interior space which may be filled with a highly deformable conductive material. In some embodiments, the highly deformable conductive material may be a liquid such as mercury or a liquid soluble conductive material such as sodium. In other embodiments the highly deformable conductive material may be a powdered or ground material such as ground metallic particles. The flexibility provided by the highly deformable tube 4735 and the highly deformable conductive material allow significant flexibility of the flexible bend radius adapter 4700, as illustrated in FIG. 47C.

In some embodiments, a bend radius adapter such as the embodiments discussed herein can be modified to include a flexible portion along at least a portion of a power transfer path, using any suitable structure described herein or any other suitable structure. FIG. 48A is a side view of an embodiment of a bend radius adapter including a flexible section. FIG. 48B is a side view of another embodiment of a bend radius adapter including a flexible segment. The bend radius adapter 4800a of FIG. 48A extends between an electrical lug 4801 and an insertion prong 4809. The section of the power transfer path adjacent the insertion prong 4809 includes a rigid "neck" section 4837, and a portion of the power transfer path between the rigid neck section 4837 includes a flexible section 4935, which may be formed using any suitable flexible structure described herein, or any other suitable structure. Fasteners 4804 extending through securement rings or apertures adjacent the lug 4801 can be used to secure the bend radius adapter 4800a in place.

The bend radius adapter 4800b of FIG. 48B is similar to the bend radius adapter 4800a of FIG. 48A, but does not include the fasteners 4804 extending through securement rings or apertures adjacent the lug 4801. The size and shape of the rigid neck portion may in some embodiments be varied in different bend radius adapters. By varying the size and/or shape of the rigid neck portion, control over the shape assumed by the flexible section of the bend radius adapter can be controlled.

Figure 48D:
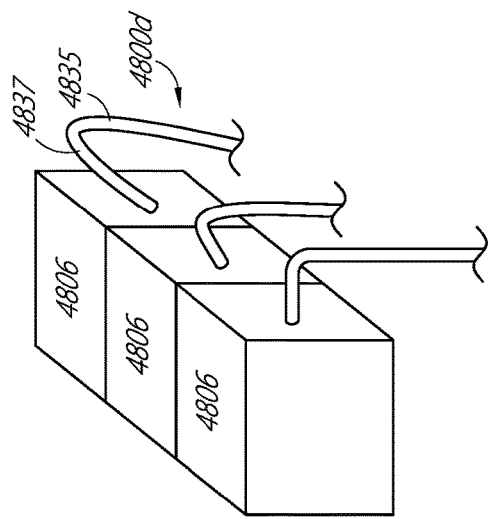
FIG. 48D is a perspective view of an array of circuit breakers in which varying neck angle of bend radius adapters is utilized to maintain spacing between adjacent bend radius adapters.
Figure 48C:
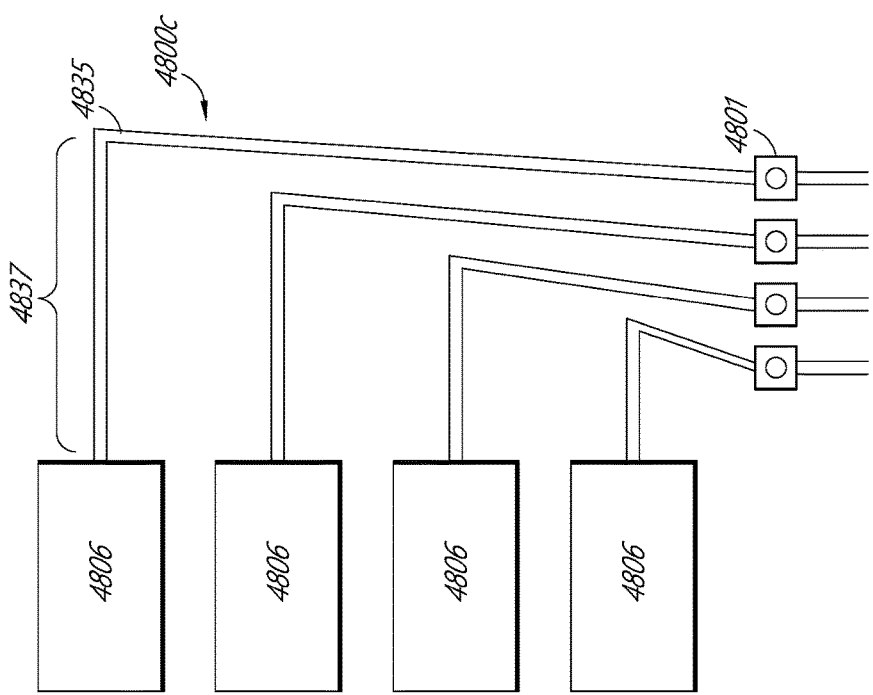
FIG. 48C is a perspective view of an array of circuit breakers in which varying neck length of bend radius adapters is utilized to maintain spacing between adjacent bend radius adapters.

FIG. 48C is a perspective view of an array of circuit breakers in which varying neck length of bend radius adapters is utilized to maintain spacing between adjacent bend radius adapters. In the array of FIG. 48C, the length of the rigid neck structures 4837 of the bend radius adapters 4800c increases with increasing distance from the lugs 4801. This, in combination with the flexibility of flexible sections 4835, allows spacing to be maintained between the various bend radius adapters 4800c.

FIG. 48D is a perspective view of an array of circuit breakers in which varying neck angle of bend radius adapters is utilized to maintain spacing between adjacent bend radius adapters. In the array of FIG. 48D, the angle of the rigid neck structures 4837 immediately adjacent the insertion prongs installed within the breakers 4806 decreases along the length of the array of breakers 4806. This, in combination with the flexibility of flexible sections 4835, allows spacing to be maintained between the various bend radius adapters 4800d.

In some embodiments, a compressive sleeve connector can be used to join two sections of stranded electrical cable together. FIG. 49A is an exploded schematic view of two sections of stranded electrical cable and a compressive sleeve connector for joining the two. FIG. 49B is a top plan view of the compressive sleeve connector of FIG. 49A. FIG. 49C is a detailed cross-sectional view of the interior structure of the connector of FIG. 49A. FIG. 49D is an axial cross-sectional view of the outer section of the connector of FIG. 49A. FIG. 49E is an axial view of the stranded electrical cable.

The connector 4900 includes a conductive hub sleeve 38 which may be centrally and axially disclosed within the compressive sleeve connector 4900. The conductive hub sleeve includes a solid central portion 38a and in the illustrated embodiment includes sleeve extensions 38b defining partially open regions on either side of the solid central portion. The sleeve extensions 38b may in some embodiments not be conductive, or the outer surface of the sleeve extensions 38b may not be conductive. In other embodiments, the conductive hub sleeve may not include sleeve extensions 38b on either side of the solid central portion 38a. Extending from both sides of the solid central portion 38a are a plurality of prongs 23. Surrounding the conductive hub sleeve 38 are a plurality of threaded collars 22 disposed radially outward of interior threading and wedge-shaped structures 24 adjacent the interior threading on the portions of the connector structure surrounding the conductive hub sleeve. In particular, the portions of the compressive connector 4900 surrounding the prongs 23 and the sleeve extensions 38b include the wedge-shaped structures 24. In the illustrated embodiment, the connector 4900 is a straight connector, but in other embodiments the solid central portion 38a may be formed with a bend, such that the prongs 23 and the sleeve extensions 38b on either side of the solid central portion are oriented in different directions. Any suitable bend angle may be formed, such as a right angle bend or any other bend angle.

The stranded cables 4914 include a plurality of core wires 30 such as copper core wires. As discussed in greater detail below, the diameter of the plurality of prongs 23 may be dependent upon the diameter of the plurality of core wires 30, such that the prongs 23 are able to be inserted into the spaces between the core wires 30.

FIG. 50A-50C illustrate various views of a process for connecting two stranded cables using the compressive sleeve connector of FIG. 49A. FIG. 50A shows a cross-sectional view in which the ends of the stranded cables 4914 have been inserted into the open ends of the connector 4900 and pressed onto the conductive prongs 23, so that the conductive prongs 23 slide into the spaced between the core wires 30. FIG. 50B is an axial cross-sectional view illustrating the insertion of the prongs 23 of the connector 4900 into the spaces between core wires 30.

In FIG. 50C, the outer threaded collars 22 have been rotated to advance the outer threaded collars 22 in the direction of increasing thickness of the wedge-shaped structures 24. The leading interior surfaces of the outer threaded collars 22 are oriented to engage the wedge-shaped structures 24, compressing the sleeve defined by the compressive sleeve connector in at least the area adjacent the prongs 23. By compressing the sleeve extensions 38b and the areas in which the prongs 23 of the connector 4900 have been inserted into the spaces between core wires 30, a frictional retaining force between the prongs 23 and the core wires 30 can be increased. With proper design of the compressive sleeve and the prongs 30, a very robust mechanical and electrical connection can be made between the two sections of the stranded cable 4914, with the resulting pull strength being equal to the pull strength of the stranded cable 4914 itself, in some embodiments.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

In the foregoing description, specific details are given to provide a thorough understanding of the examples. However, it will be understood by one of ordinary skill in the art that the examples may be practiced without these specific details. Certain embodiments that are described separately herein can be combined in a single embodiment, and the features described with reference to a given embodiment also can be implemented in multiple embodiments separately or in any suitable subcombination. For example, various components or devices may be described in general terms or illustrated schematically, in order not to obscure the examples in unnecessary detail. In other instances, such components, other structures and techniques may be shown in detail to further explain the examples.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A bend radius adapter, comprising
a rigid power transfer bar extending between a first end and a second end;
an insulating sleeve surrounding at least a portion of the power transfer bar;
at least one securement feature electrically isolated from the rigid power transfer bar, the at least one securement feature comprising an insulated aperture extending through a portion of the rigid power transfer bar;
a first connection point adjacent the first end of the power transfer bar, the first connection point configured to allow an electrical connection between the power transfer bar and a first wire in a first orientation; and
a second connection point adjacent the second end of the power transfer bar, the second connection point configured to allow an electrical connection between the power transfer bar and a second wire in a second orientation, the second orientation different than the first orientation.

2. The adapter of claim 1, wherein the at least one securement structure further comprises an aperture extending through a laterally extending portion of the insulating sleeve.

3. The adapter of claim 1, wherein at least one of the first connection point and the second connection point comprise an electrical lug having a compression screw, the electrical lug being configured to retain a portion of the first wire or second wire and place the first wire or second wire in electrical communication with the power transfer bar.

4. The adapter of claim 3, wherein the first connection point comprises the electrical lug configured to receive a portion of a wire extending in a first direction, and wherein the second connection point comprises a second electrical lug configured to receive a portion of the second wire extending in a second direction, the first and second directions being substantially perpendicular to one another.

5. The adapter of claim 1, wherein at least one of the first connection point and the second connection point comprise a portion of the power transfer bar not covered by the insulating sleeve.

6. The adapter of claim 5, wherein the portion of the power transfer bar not covered by the insulating sleeve comprises an insertion prong, wherein the insertion prong is dimensioned and shaped to be inserted into a lug of a circuit breaker.

7. The adapter of claim 1, wherein the power transfer bar comprises a conductive core and a plurality of prongs extending in two separate directions from the conductive core, each of the plurality of prongs in electrical communication with one another via the conductive core.

8. The adapter of claim 6, wherein the first wire comprises a plurality of conductive strands, and wherein a first subset of the plurality of conductive prongs are configured to be inserted between the conductive strands of the first wire, the adapter additionally comprising a compressive sleeve structure configured to compress at least a portion of the first wire through which the first subset of the plurality of conductive prongs extend.

9. The adapter of claim 1, wherein the power transfer bar comprises a bent portion.

10. An adjustable bend radius adapter, comprising
a power transfer path extending between a first end and a second end, the power transfer path comprising at least two rigid power transfer bars connected by a rotatable joint, at least a portion of the power transfer path being adjustable to vary an amount of bending in the power transfer path;
an insulating sleeve surrounding at least a portion of the power transfer path;
a first connection point adjacent the first end of the power transfer path, the first connection point configured to allow an electrical connection between the power transfer path and a first wire in a first orientation; and
a second connection point adjacent the second end of the power transfer path, the second connection point configured to allow an electrical connection between the power transfer path and a second wire in a second orientation, the second orientation different than the first orientation.

11. The adapter of claim 10, wherein the rotatable joint comprises facing sections of the at least two rigid power transfer bars, the facing sections comprising interlocking radially-extending teeth, and an adjustment screw extending through at least a portion of the facing sections of the at least two rigid power transfer bars.

12. The adapter of claim 10, additionally comprising a third rigid power transfer bar and a second rotatable joint, wherein the third rigid power transfer bar extends between the first and second rotatable joints.

13. An adjustable bend radius adapter, comprising:
a first rigid power transfer bar section;
a second rigid power transfer bar section, the first rigid power transfer bar section being movable relative to the second rigid power transfer bar section to vary the orientation of the first rigid power transfer bar section relative to the second rigid power transfer bar section;
an insulating sleeve;
a plurality of flexible wires encased within the insulating sleeve and extending between the first rigid power transfer bar section and the second rigid power transfer bar section; and
a first connection point adjacent the first rigid power transfer bar section, the first connection point configured to allow an electrical connection between the first rigid power transfer bar section and a first wire in a first orientation; and
a second connection point adjacent the second rigid power transfer bar section, the second connection point configured to allow an electrical connection between the second rigid power transfer bar section and a second wire in a second orientation, the second orientation different than the first orientation.

14. The adapter of claim 13, wherein the plurality of flexible wires have diameters of less than 0.5 millimeters.

15. The adapter of claim 10, a portion of the power transfer path includes a hollow tube filled with a deformable conductive material.

16. The adapter of claim 10, wherein the first connection point comprises an electrical lug.

17. The adapter of claim 10, wherein the second connection point comprises an insertion prong.

\* \* \* \* \*